US011870188B2

(12) United States Patent
Tanaka et al.

(10) Patent No.: US 11,870,188 B2
(45) Date of Patent: Jan. 9, 2024

(54) GROUND COUPLING STRUCTURE IN COAXIAL CONNECTOR SET

(71) Applicant: Murata Manufacturing Co., Ltd., Kyoto-fu (JP)

(72) Inventors: Aoi Tanaka, Nagaokakyo (JP); Katsumi Kohnishi, Nagaokakyo (JP); Daisuke Okada, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 392 days.

(21) Appl. No.: 17/356,159

(22) Filed: Jun. 23, 2021

(65) Prior Publication Data

US 2021/0320464 A1 Oct. 14, 2021

Related U.S. Application Data

(63) Continuation of application No. PCT/JP2020/018712, filed on May 8, 2020.

(30) Foreign Application Priority Data

May 10, 2019 (JP) ................................ 2019-089868

(51) Int. Cl.

*H01R 9/05* (2006.01)
*H01R 24/40* (2011.01)
*H01R 24/50* (2011.01)

(52) U.S. Cl.

CPC ............ *H01R 24/40* (2013.01); *H01R 24/50* (2013.01)

(58) Field of Classification Search

CPC ...... H01R 24/40; H01R 24/50; H01R 9/0518; H01R 13/6594; H01R 13/6592; H01R 9/05

See application file for complete search history.

(56) References Cited

U.S. PATENT DOCUMENTS 7,540,774 B1 * 6/2009 Hung .................... H01R 24/40 439/582
9,941,606 B1 * 4/2018 Hashimoto .......... H01R 24/545

(Continued)

FOREIGN PATENT DOCUMENTS

JP 2010-080262 A 4/2010
JP 2011-204423 A 10/2011

(Continued)

OTHER PUBLICATIONS

International Search Report issued in PCT/JP2020/018712; dated Jul. 21, 2020.

(Continued)

*Primary Examiner* — Abdullah A Riyami
*Assistant Examiner* — Nelson R. Burgos-Guntin
(74) *Attorney, Agent, or Firm* — Studebaker & Brackett PC

(57) ABSTRACT

A coaxial connector set including a first connector to which a coaxial cable having a center conductor and an outer conductor is connected, and a second connector mounted on a circuit board having a ground coupling portion. The first connector has a first outer terminal, and the second connector has a second outer terminal. The first outer terminal has an outer conductor clamp portion, a first outer contact portion, and a tip surrounding portion positioned between the outer conductor clamp portion and the first outer contact portion and surrounding a tip portion of the center conductor. Shortcut coupling paths are formed between the tip surrounding portion and the second outer terminal or the ground coupling portion.

32 Claims, 21 Drawing Sheets

(56) References Cited

U.S. PATENT DOCUMENTS

| | | | | |
|---|---|---|---|---|
| 9,941,646 | B1 * | 4/2018 | Hashimoto | H01R 13/658 |
| 2003/0178219 | A1 * | 9/2003 | Kuroda | H01R 24/50 174/75 C |
| 2003/0190824 | A1 * | 10/2003 | Ko | H01R 9/0518 439/63 |
| 2007/0190868 | A1 * | 8/2007 | De Cloet | H01R 13/6277 439/851 |
| 2008/0014792 | A1 * | 1/2008 | Chen | H01R 9/0518 439/581 |
| 2009/0313021 | A1 | 12/2009 | Carminati et al. | |
| 2010/0041270 | A1 | 2/2010 | Chen | |
| 2012/0009817 | A1 * | 1/2012 | Tagawa | H01R 24/54 439/578 |
| 2012/0295477 | A1 * | 11/2012 | Funahashi | H01R 24/545 439/578 |
| 2012/0322304 | A1 * | 12/2012 | Taguchi | H01R 13/501 439/582 |
| 2013/0149887 | A1 * | 6/2013 | Chen | H01R 13/627 439/357 |
| 2013/0149897 | A1 * | 6/2013 | Takano | H01R 12/718 439/582 |
| 2013/0171876 | A1 * | 7/2013 | Funahashi | H01R 24/50 439/620.03 |
| 2014/0106581 | A1 * | 4/2014 | Hashiguchi | H01R 24/40 439/77 |
| 2015/0044912 | A1 * | 2/2015 | Hashimoto | H01R 9/0518 439/626 |
| 2015/0056866 | A1 | 2/2015 | Osaki | |
| 2015/0244086 | A1 * | 8/2015 | Chen | H01R 9/0518 439/578 |
| 2015/0364843 | A1 * | 12/2015 | Yamauchi | H01R 9/053 439/394 |
| 2016/0218471 | A1 * | 7/2016 | Hashimoto | H01R 24/44 |
| 2017/0346209 | A1 * | 11/2017 | Hashimoto | H01R 24/40 |
| 2018/0048101 | A1 * | 2/2018 | Maruyama | H05K 3/308 |
| 2018/0069335 | A1 * | 3/2018 | Hashimoto | H01R 12/712 |
| 2018/0212363 | A1 * | 7/2018 | Fukumoto | H01R 9/0515 |
| 2018/0316144 | A1 * | 11/2018 | Yamauchi | H01R 24/50 |

FOREIGN PATENT DOCUMENTS

| | | | |
|---|---|---|---|
| JP | 4803761 | B2 | 10/2011 |
| JP | 2016-192274 | A | 11/2016 |
| JP | 2017-091970 | A | 5/2017 |
| JP | 2017-212092 | A | 11/2017 |
| JP | 2018-110068 | A | 7/2018 |
| JP | 2019-050091 | A | 3/2019 |
| WO | 2014/013833 | A1 | 1/2014 |
| WO | 2018/221354 | A1 | 12/2018 |
| WO | 2020/189221 | A1 | 9/2020 |

OTHER PUBLICATIONS

An Office Action mailed by the Japanese Patent Office dated Sep. 14, 2021, which corresponds to Japanese Patent Application No. 2021-027476 and is related to U.S. Appl. No. 17/356,159 with English language translation.

* cited by examiner

GROUND COUPLING STRUCTURE IN COAXIAL CONNECTOR SET

CROSS-REFERENCE TO RELATED APPLICATIONS

This application claims benefit of priority to International Patent Application No. PCT/JP2020/018712, filed May 8, 2020, and to Japanese Patent Application No. 2019-089868, filed May 10, 2019, the entire contents of each are incorporated herein by reference.

BACKGROUND

Technical Field

The present disclosure relates to a ground coupling structure in a coaxial connector set.

Background Art

For example, the coaxial connector disclosed in U.S. Patent Application Publication No. 2010/0041270 (US2010/0041270 A1) includes an insulating body, a central terminal, and a housing; and the housing has a cylindrical main portion, a plate member, and a cable-clamping member to clamp the coaxial cable, the cable-clamping member being positioned at an end portion of the plate member.

In the coaxial connector described in U.S. Patent Application Publication No. 2010/0041270 (US2010/0041270 A1), a side arm is provided between the main portion and the cable-clamping member, and the insulating body is wrapped by the side arm. Further, it is disclosed that an arc-shaped surface is provided on a front side of the side arm, and the arc-shaped surface is in contact with an outer end portion of the main portion.

SUMMARY

U.S. Patent Application Publication No. 2010/0041270 (US2010/0041270 A1) only discloses a contact between the main portion constituting the housing and the side arm in the coaxial connector (first connector), that is, the contact in the housing of the coaxial connector; the relationship between the coaxial connector (first connector) and a housing of a mating connector (second connector) is not disclosed at all.

Incidentally, in a coupling structure of a first connector, to which coaxial cable is connected, and a second connector, generation of an unnecessary electrical potential difference may lead to radiation of noise, and stable signal transmission in a radio frequency band may be disturbed.

Accordingly, the present disclosure provides a ground coupling structure in a coaxial connector set that enables stable signal transmission in a radio frequency band.

A ground coupling structure in a coaxial connector set according to one aspect of the present disclosure is configured as follows. In the coaxial connector set including a first connector to which a coaxial cable having a center conductor and an outer conductor is connected and a second connector mounted on a circuit board having a ground coupling portion. The first connector has a first outer terminal connected to the outer conductor and the second connector has a second outer terminal to be coupled to the first outer terminal. The first outer terminal includes an outer conductor clamp portion clamping the outer conductor, a first outer contact portion to be coupled to the second outer terminal, and a tip surrounding portion positioned between the outer conductor clamp portion and the first outer contact portion and surrounding a tip portion of the center conductor. The second outer terminal includes a second outer contact portion to be coupled to the first outer contact portion and a second outer mount portion mounted on the ground coupling portion of the circuit board. A shortcut coupling path is formed between the tip surrounding portion and the second outer terminal or the ground coupling portion.

Further, a ground coupling structure in a coaxial connector set according to another aspect of the present disclosure is configured as follows. In the coaxial connector set including a first connector to which a coaxial cable having a center conductor and an outer conductor is connected and a second connector mounted on a circuit board having a ground coupling portion. The first connector has a first outer terminal connected to the outer conductor and the second connector has a second outer terminal to be coupled to the first outer terminal. The first outer terminal includes an outer conductor clamp portion clamping the outer conductor, a first outer contact portion to be coupled to the second outer terminal, a tip surrounding portion positioned between the outer conductor clamp portion and the first outer contact portion and surrounding a tip portion of the center conductor, and an outer conductor connection portion connecting the first outer contact portion and the tip surrounding portion. The second outer terminal includes a second outer contact portion to be coupled to the first outer contact portion and a second outer mount portion mounted on the ground coupling portion of the circuit board. A coupling portion coupling the tip surrounding portion and the second outer terminal or the ground coupling portion without using the outer conductor connection portion is provided. The coupling portion is positioned closer to the circuit board than the outer conductor connection portion.

According to an aspect of the present disclosure, since the shortcut coupling path couples the tip surrounding portion of the first outer terminal and the second outer terminal or the ground coupling portion of the circuit board with a short distance, stable signal transmission in a radio frequency band may be performed.

According to another aspect of the present disclosure, since the coupling portion connects the tip surrounding portion of the first outer terminal and the second outer terminal or the ground coupling portion of the circuit board with a short distance, stable signal transmission in a radio frequency band may be performed.

DETAILED DESCRIPTION

Figure 1:
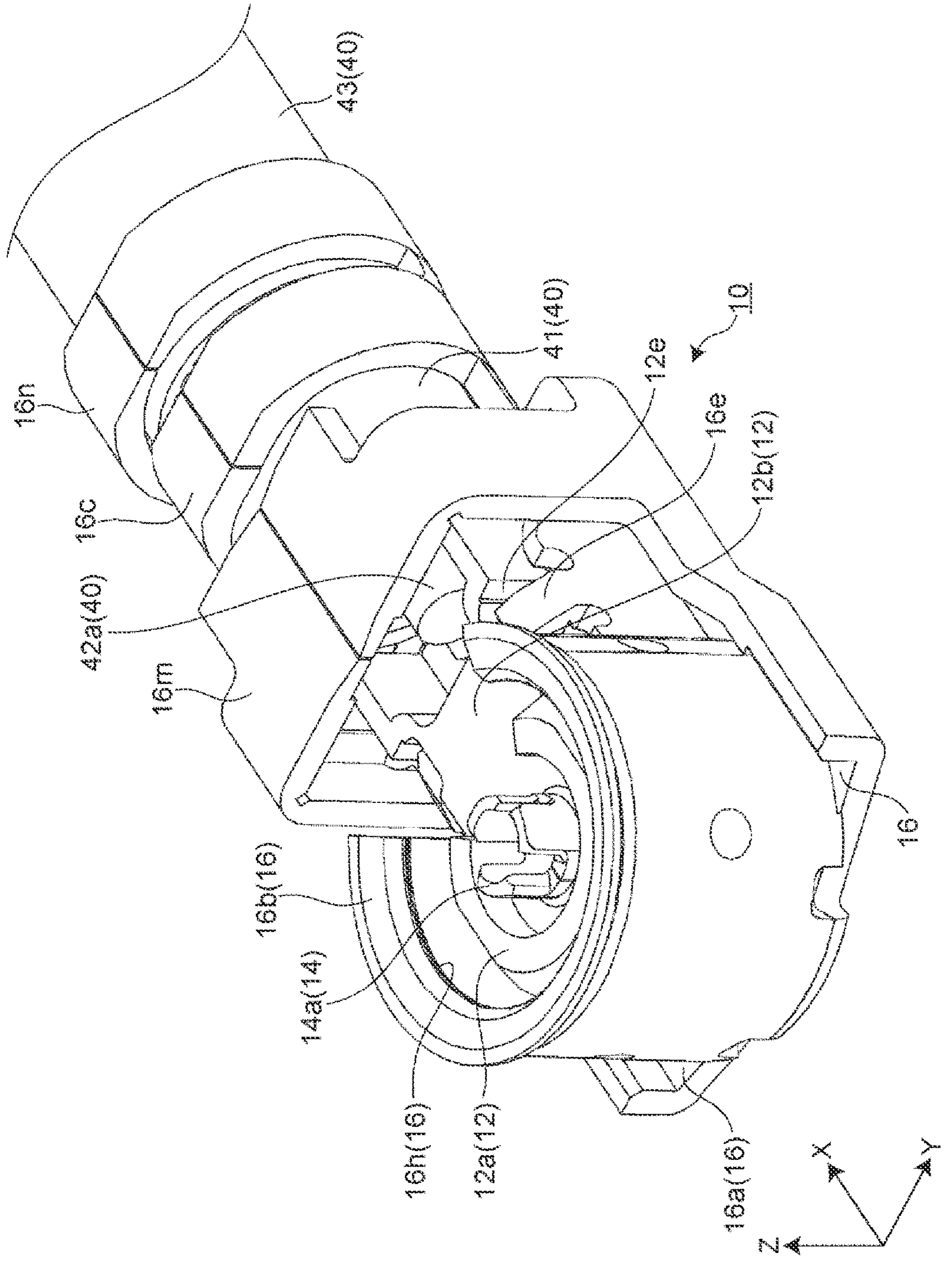
FIG. 1 is a perspective view of a first connector with a coaxial cable constituting a coaxial connector set.

Hereinafter, embodiments of a ground coupling structure in a coaxial connector set 30 according to the present disclosure will be described with reference to the drawings. Note that, an X axis, a Y axis, and a Z axis that are orthogonal to each other are illustrated in the drawings for convenience of description.

In the present disclosure, a shortcut coupling path refers to a path that couples a tip surrounding portion 16*m* of a first outer terminal 16 and a second outer terminal 26 (including a second outer contact portion 26*b* and a second outer mount portion 26*a*), or a ground coupling portion 57 of a circuit board 50 with a distance as short as possible, that is, in a shorter route, by taking an elasticity and a contact structure into consideration. Further, in the present disclosure, a coupling portion refers to a separate member which is positioned closer to the circuit board 50 than an outer conductor connection portion 16*a*, in other words, positioned on a side opposite to the outer conductor connection portion 16*a* (that is, on a side closer to the circuit board 50); and the coupling portion electrically couples the tip surrounding portion 16*m* and the second outer terminal 26 or the ground coupling portion 57 without using the outer conductor connection portion 16*a*. Further, in the present disclosure, "surrounding" means that an object surrounds another object in a contact state or in a non-contact state.

[Coaxial Connector Set]

Figure 6:
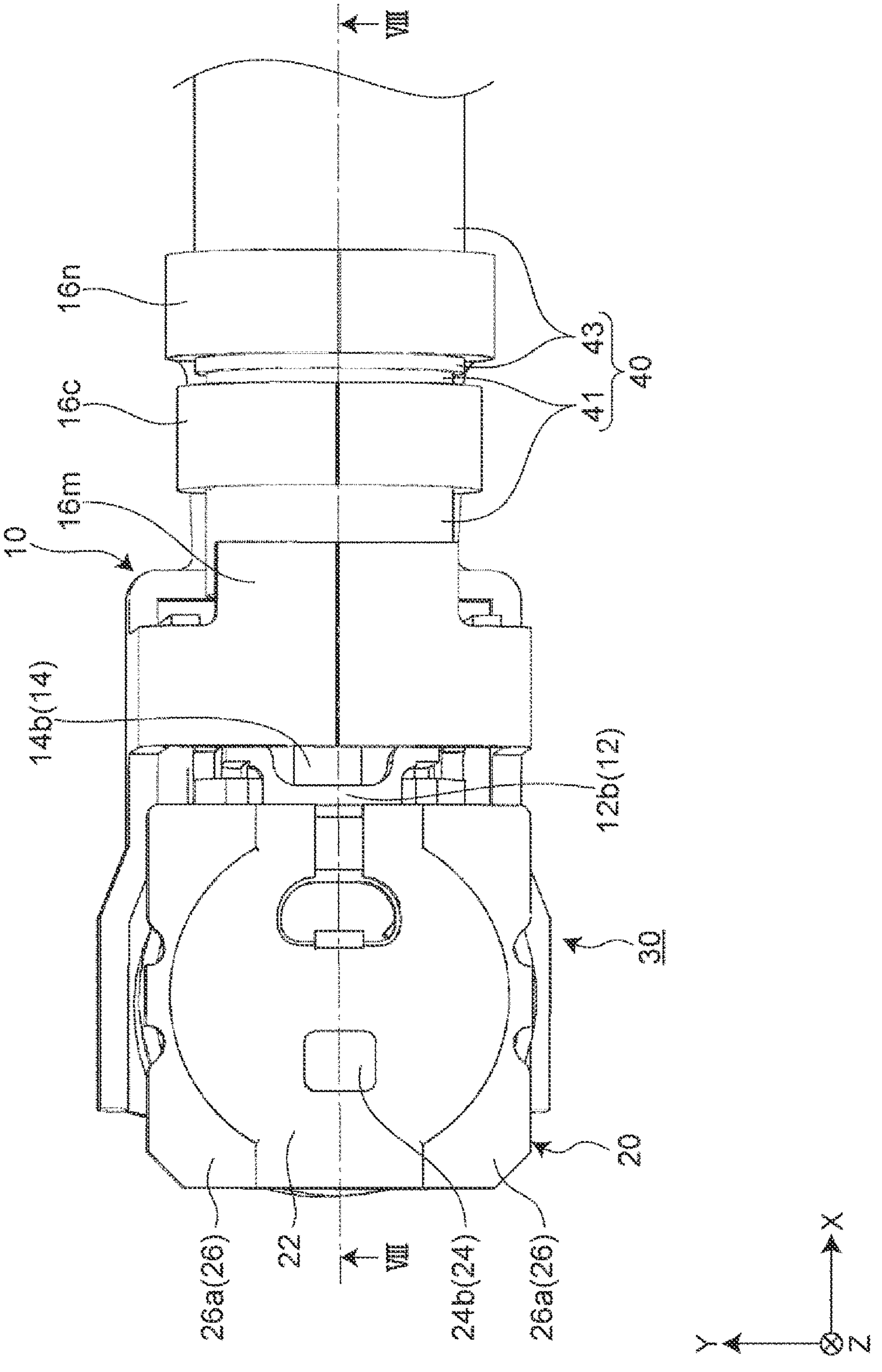
FIG. 6 is a plan view illustrating a connector fitting state in which the second connector is fitted to the first connector with the coaxial cable.
Figure 7:
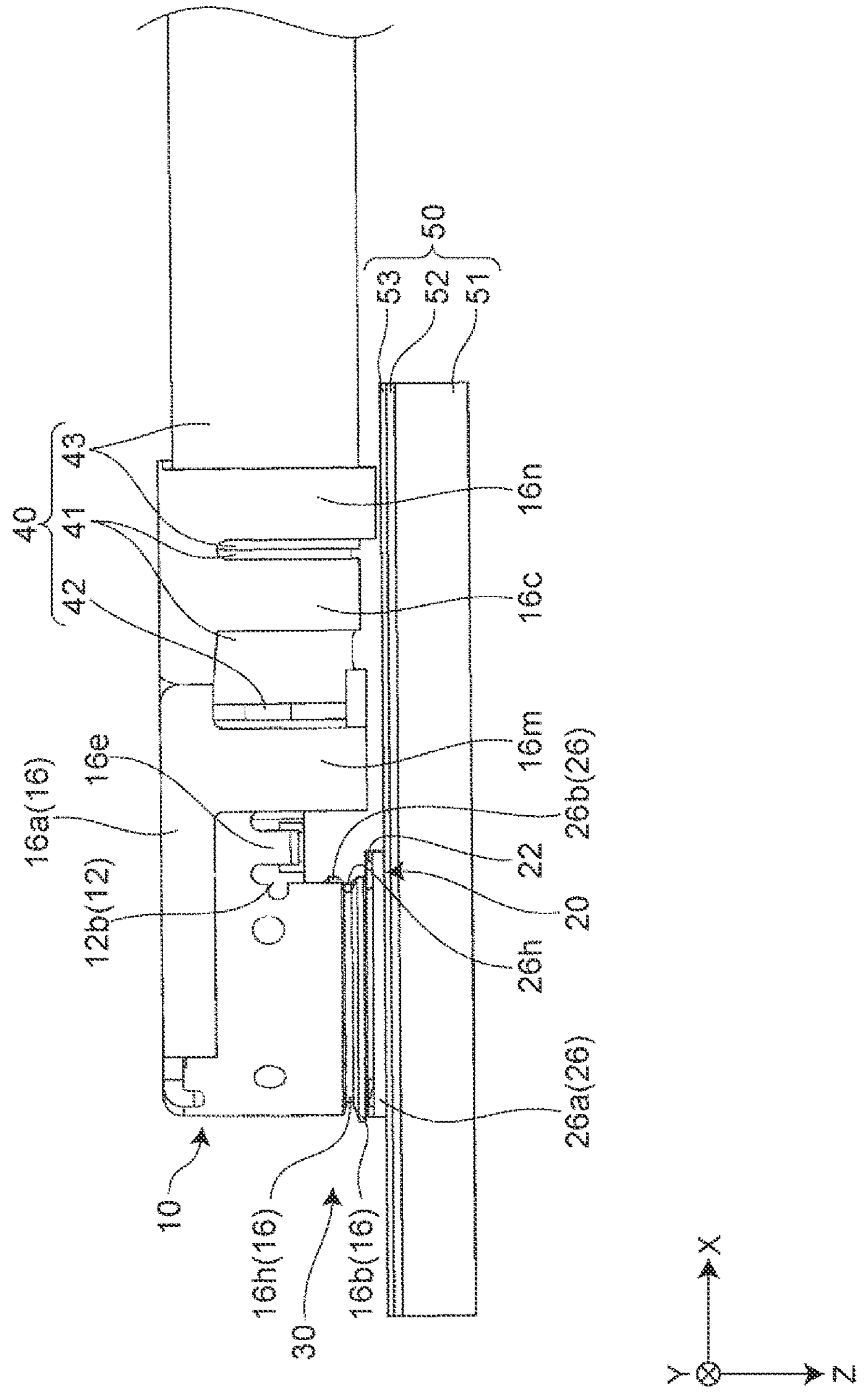
FIG. 7 is a side view illustrating the connector fitting state in FIG. 6.
Figure 8:
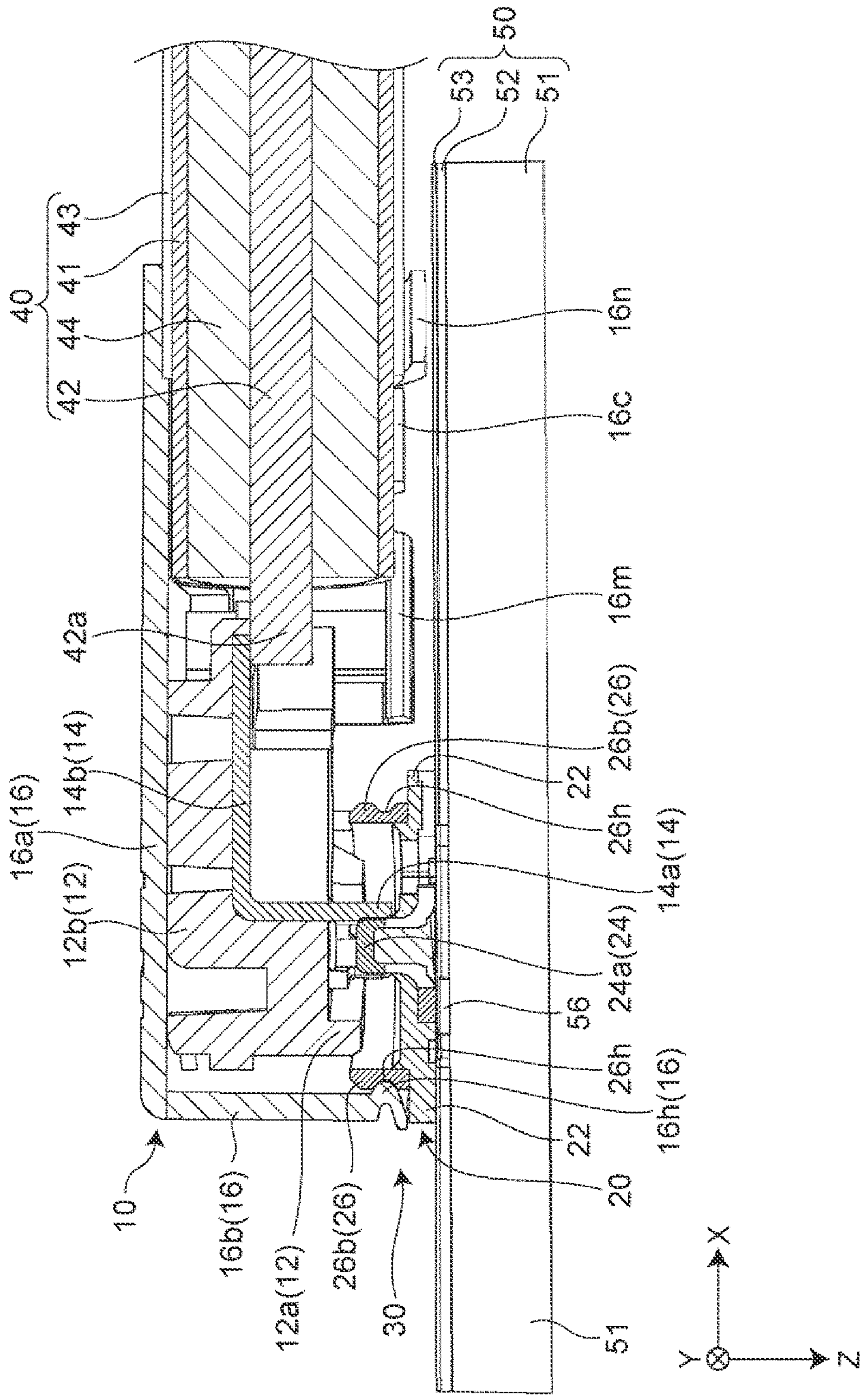
FIG. 8 is a sectional view taken along a line VIII-VIII in FIG. 6.

FIG. 6 is a plan view illustrating a connector fitting state in which a second connector 20 is fitted to a first connector 10 with a coaxial cable 40. FIG. 7 is a side view illustrating the connector fitting state in FIG. 6. FIG. 8 is a sectional view taken along a line VIII-VIII in FIG. 6.

As illustrated in FIG. 6 to FIG. 8, the coaxial connector set 30 includes the first connector 10 and the second connector 20. The coaxial connector set 30 is configured to fit the first connector 10 to the second connector 20 for mating in a manner that the first connector 10 may be plugged or unplugged in a plug-unplug direction (Z axis direction). While the first connector 10 is connected to the coaxial cable 40, the second connector 20 is mounted on the circuit board 50. In the coaxial connector set 30 in FIG. 7 and FIG. 8, illustrated is a connector fitting state in which the first connector 10 and the second connector 20 are fitted to each other; and the connector fitting state is achieved by moving the first connector 10 to the second connector 20 in the plug-unplug direction (Z axis direction) in a state in which the first connector 10 faces the second connector 20 mounted on the circuit board 50.

[First Connector]

Figure 2:
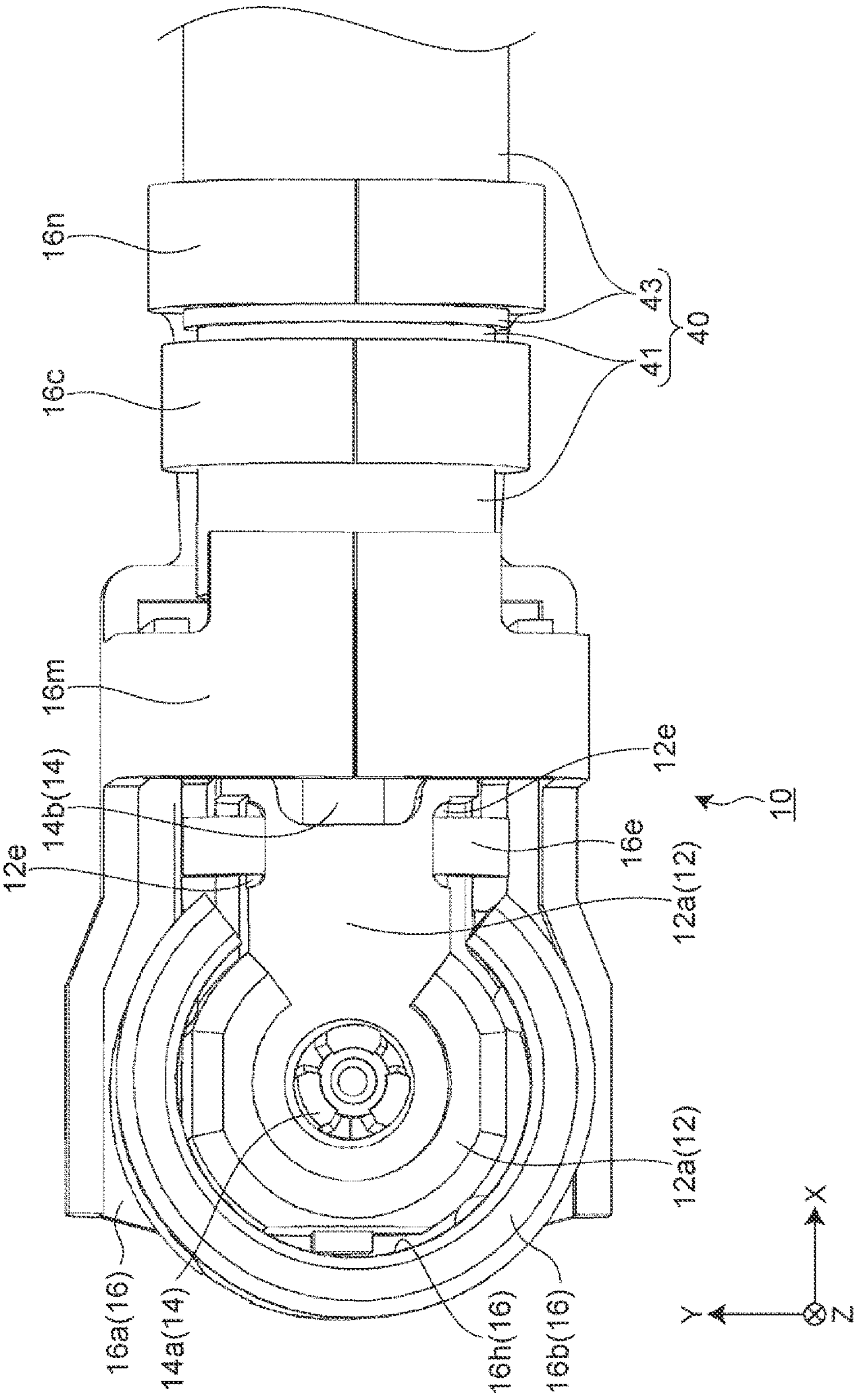
FIG. 2 is a plan view of the first connector with the coaxial cable illustrated in FIG. 1.
Figure 3:
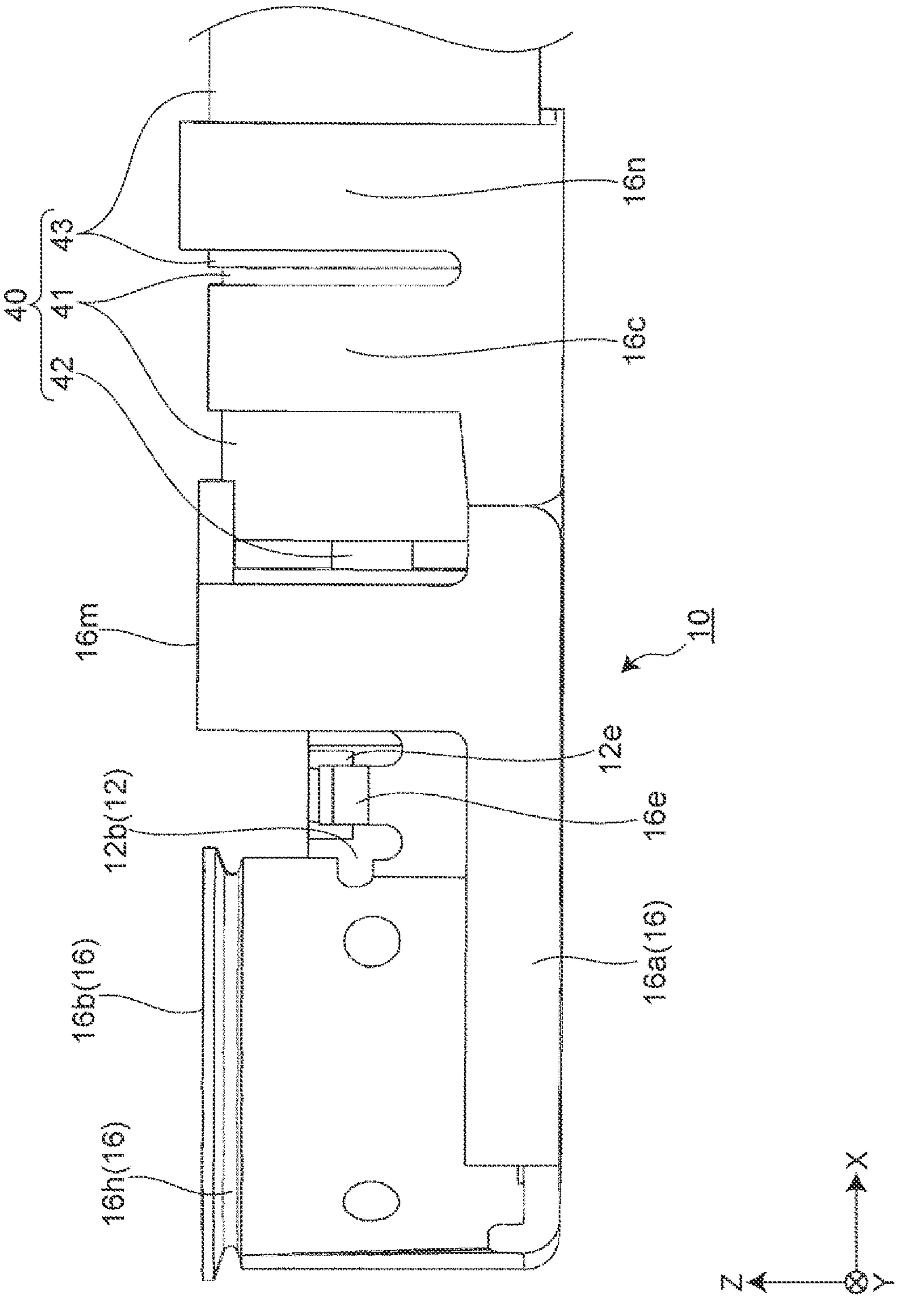
FIG. 3 is a side view of the first connector with the coaxial cable illustrated in FIG. 1.

FIG. 1 is a perspective view of the first connector 10 with the coaxial cable 40 constituting the coaxial connector set 30 illustrated in FIG. 6 to FIG. 8. FIG. 2 is a plan view of the first connector 10 with the coaxial cable 40 illustrated in FIG. 1. FIG. 3 is a side view of the first connector 10 with the coaxial cable 40 illustrated in FIG. 1.

As illustrated in FIG. 1 to FIG. 3, the first connector 10 is an L-type coaxial connector including a first insulation member (bushing) 12, a first inner terminal (center socket) 14, and the first outer terminal (housing) 16. The constituting elements of the first connector 10 related to the electrical connection are configured to have substantial symmetry with respect to an axial direction of the coaxial cable 40 as viewed from the plug-unplug direction (Z axis direction).

The first inner terminal 14 is a terminal connected to a center conductor 42 of the coaxial cable 40. The first inner terminal 14 is electrically insulated from the first outer terminal 16 by the first insulation member 12.

The first inner terminal 14 is formed of a member having conductivity. The first inner terminal 14 is made of one metal plate such as a copper alloy material, for example, and is plated with nickel and gold on the surface thereof. The first inner terminal 14 is integrated with the first insulation member 12 by insert molding. With the use of the stated configuration, positioning between the first insulation member 12 and the first inner terminal 14 may accurately be performed. Further, although accuracy is required, the stated aspect of integration may be achieved by fitting the first inner terminal 14 into the first insulation member 12.

The first inner terminal 14 includes a first inner contact portion 14*a* and a center conductor connection portion 14*b*. As illustrated in FIG. 8, the first inner terminal 14 is bent in an L-shape in a sectional view.

The first inner contact portion 14*a* extends in a direction orthogonal to the axial direction of the coaxial cable 40, that is, in the plug-unplug direction (Z axis direction). The first inner contact portion 14*a* has a substantially cylindrical shape partially cut out in a circumferential direction.

The first inner contact portion 14*a* electrically comes into contact with a second inner contact portion 24*a* of a second inner terminal 24 of the second connector 20. The first inner contact portion 14*a* illustrated in FIG. 1 and FIG. 2 is configured as a female type (socket type) having a contact surface on an inner peripheral portion thereof.

The center conductor connection portion 14*b* extends in the axial direction of the coaxial cable 40, that is, in a lateral direction (X axis direction) orthogonal to the plug-unplug direction. The center conductor connection portion 14*b* is a plate-shaped terminal portion extending in the lateral direction from the first inner contact portion 14*a*. The center conductor connection portion 14*b* is electrically connected to a tip portion 42*a* of the center conductor 42 of the coaxial cable 40. The end portion of the center conductor connection portion 14*b* on a side of the coaxial cable 40 and the tip portion 42*a* of the center conductor 42 are fixed and electrically connected to each other by soldering. Note that a bifurcated portion may be formed on the end portion of the center conductor connection portion 14*b* on the side of the coaxial cable 40. In this case, sandwiching the tip portion 42*a* of the center conductor 42 by the bifurcated portion further strengthen the connection.

The first outer terminal 16 is a terminal connected to an outer conductor 41 of the coaxial cable 40. The first outer terminal 16 is formed of a member having conductivity. The first outer terminal 16 is made of one metal plate such as a copper alloy material, for example, and is plated with nickel and gold on the surface thereof.

The first outer terminal 16 includes the outer conductor connection portion 16*a*, a first outer contact portion 16*b*, an outer conductor clamp portion 16*c*, a retaining portion 16*e*, the tip surrounding portion 16*m*, and a cable clamp portion 16*n*.

The outer conductor connection portion 16*a* has a plate shape extending from the first outer contact portion 16*b* in a lateral direction (X axis direction). The outer conductor connection portion 16*a* is positioned along the first insulation member 12 and the coaxial cable 40, and holds the first insulation member 12 and the coaxial cable 40.

The first outer contact portion 16*b* has a cylindrical shape, and fits to the second outer terminal 26 of the second connector 20. The first outer contact portion 16*b* extends in the plug-unplug direction (Z axis direction). As viewed from the plug-unplug direction (Z axis direction), the first outer contact portion 16*b* has a cavity on a side of the coaxial cable 40. An inner holding portion 12*a* of the first insulation member 12 is inserted and fixed in the first outer contact portion 16*b* through the cavity of the first outer contact portion 16*b*. With the use of the stated configuration, deformation of the first outer contact portion 16*b* is less likely to occur than in a case where the outer terminal is configured of a plurality of spring pieces formed by a plurality of slits extending in the plug-unplug direction (Z axis direction), and therefore stable fitting may be achieved. The first inner contact portion 14*a* of the first inner terminal 14 is positioned inside the first outer contact portion 16*b*. At this time, the first outer contact portion 16*b* is positioned to be coaxial with the first inner contact portion 14*a* as viewed from the plug-unplug direction (Z axis direction).

The first outer contact portion 16*b* has a substantially cylindrical shape having a cut out portion in which a circumferential direction portion of the cylindrical shape on the side of the coaxial cable 40 is cut out in an arc shape. A center conductor holding portion 12*b* of the first insulation member 12 is inserted and mounted through the cutout portion.

The outer conductor clamp portion 16*c* extends from the outer conductor connection portion 16*a* in the plug-unplug direction (Z axis direction). The outer conductor clamp portion 16*c* is configured of a pair of plate-shaped members formed to face each other in a width direction (Y axis direction). The outer conductor clamp portion 16*c* is bent toward a virtual center line and crimped, and therefore, comes into contact with the outer conductor 41 of the coaxial cable 40. With this, the first outer terminal 16 and the outer conductor 41 are electrically connected, and the coaxial cable 40 is clamped (held and fixed) to the first outer terminal 16.

The retaining portion 16*e* is provided in a side extending portion extending from the first outer contact portion 16*b* toward the side of the coaxial cable 40. The retaining portion 16*e* extends from the side extending portion in the plug-unplug direction (Z axis direction). The retaining portion 16*e* is configured of a pair of plate-shaped members formed to face each other in the width direction (Y axis direction). By bending and crimping the retaining portion 16*e* toward the virtual center line, the tip portion of the retaining portion 16*e* engages with a retaining recessed portion 12*e* of the center conductor holding portion 12*b*. With the use of the stated configuration, the retaining portion 16*e* prevents the center conductor holding portion 12*b* of the first insulation member 12 from coming off in the plug-unplug direction (Z axis direction), and the first insulation member 12 is held and fixed to the first outer terminal 16.

The cable clamp portion 16*n* is positioned on an opposite side of the first outer terminal 16 from the first outer contact portion 16*b* and farther from the first outer contact portion 16*b* than the outer conductor clamp portion 16*c*, and extends from the outer conductor connection portion 16*a* in the plug-unplug direction (Z axis direction). The cable clamp portion 16*n* is configured of a pair of plate-shaped members formed to face each other in the width direction (Y axis direction). By bending and crimping the cable clamp portion 16*n* toward the virtual center line, the cable clamp portion 16*n* comes into contact with an outer skin 43 of the coaxial cable 40. With this, the coaxial cable 40 is clamped (held and fixed) to the first outer terminal 16.

The tip surrounding portion 16*m* is positioned between the first outer contact portion 16*b* and the outer conductor clamp portion 16*c*, and extends from the outer conductor connection portion 16*a* in the plug-unplug direction (Z axis direction). The tip surrounding portion 16*m* is configured of a pair of plate-shaped members formed to face each other in the width direction (Y axis direction). By bending toward the virtual center line, the tip surrounding portion 16*m* is formed in a rectangular shape in a sectional view in the width direction (Y axis direction). The rectangular shaped tip surrounding portion 16*m* surrounds the tip portion 42*a* being exposed to the outside, which is a portion of the center conductor 42 of the coaxial cable 40.

The first insulation member 12 is disposed between the first inner terminal 14 and the first outer terminal 16. The first insulation member 12 is made of electrical insulation resin (such as liquid crystal polymer, for example), and electrically insulates the first inner terminal 14 and the first outer terminal 16 from each other.

The first insulation member 12 includes the inner holding portion 12*a* and the center conductor holding portion 1*b*.

The inner holding portion 12*a* has a substantially circular shape as viewed from the plug-unplug direction (Z axis direction). The inner holding portion 12*a* is sized to be attachable to the inside of the first outer contact portion 16*b* through the cavity of the first outer contact portion 16*b* in the plug-unplug direction (Z axis direction). In the inner holding portion 12*a*, the first inner contact portion 14*a* of the first inner terminal 14 bulges in the plug-unplug direction (Z axis direction). The first inner contact portion 14*a* is integrated with the inner holding portion 12*a* to be coaxial with the inner holding portion 12*a*. For example, the first inner contact portion 14*a* is integrated with the inner holding portion 12*a* by insert molding, and part of the center conductor connection portion 14*b* is integrated with the inner holding portion 12*a*. With the use of the stated configuration, positioning between the first insulation member 12 and the first inner terminal 14 may accurately be performed.

The center conductor holding portion 12*b* extends from the inner holding portion 12*a* to the side of the coaxial cable 40. The center conductor holding portion 12*b* has a substantially rectangular shape as viewed from the plug-unplug direction (Z axis direction). The remaining portion of the center conductor connection portion 14*b* is embedded in the center conductor holding portion 12*b*, and is exposed from the center conductor holding portion 12*b*. The end portion of the exposed center conductor connection portion 14*b* is electrically connected to the tip portion 42*a* of the center conductor 42 as the above-described bifurcated portion. A pair of retaining recessed portions 12*e* are formed in an upper surface portion of the center conductor holding portion 12*b* in the width direction (Y axis direction). Note that, it is also possible to adopt an aspect in which the center conductor connection portion 14*b* extends in a planar shape in the axial direction of the coaxial cable 40, that is, in a lateral direction (X axis direction) orthogonal to the plug-unplug direction.

[Second Connector]

Figure 4:
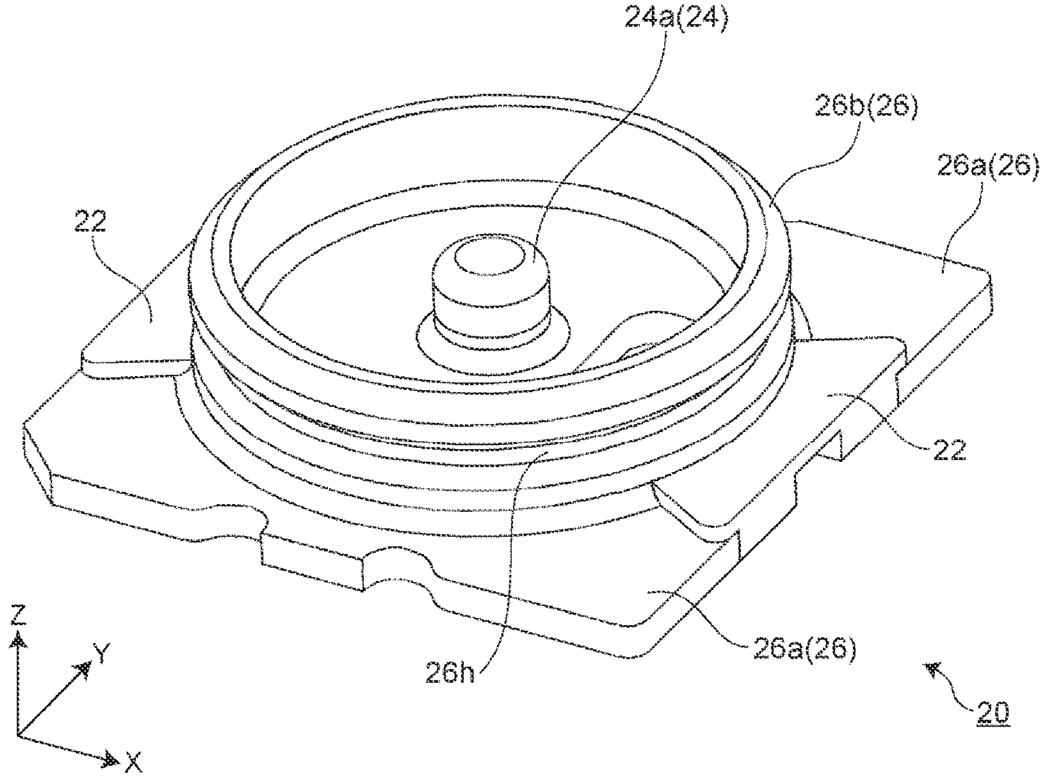
FIG. 4 is a perspective view of a second connector constituting the coaxial connector set.
Figure 5:
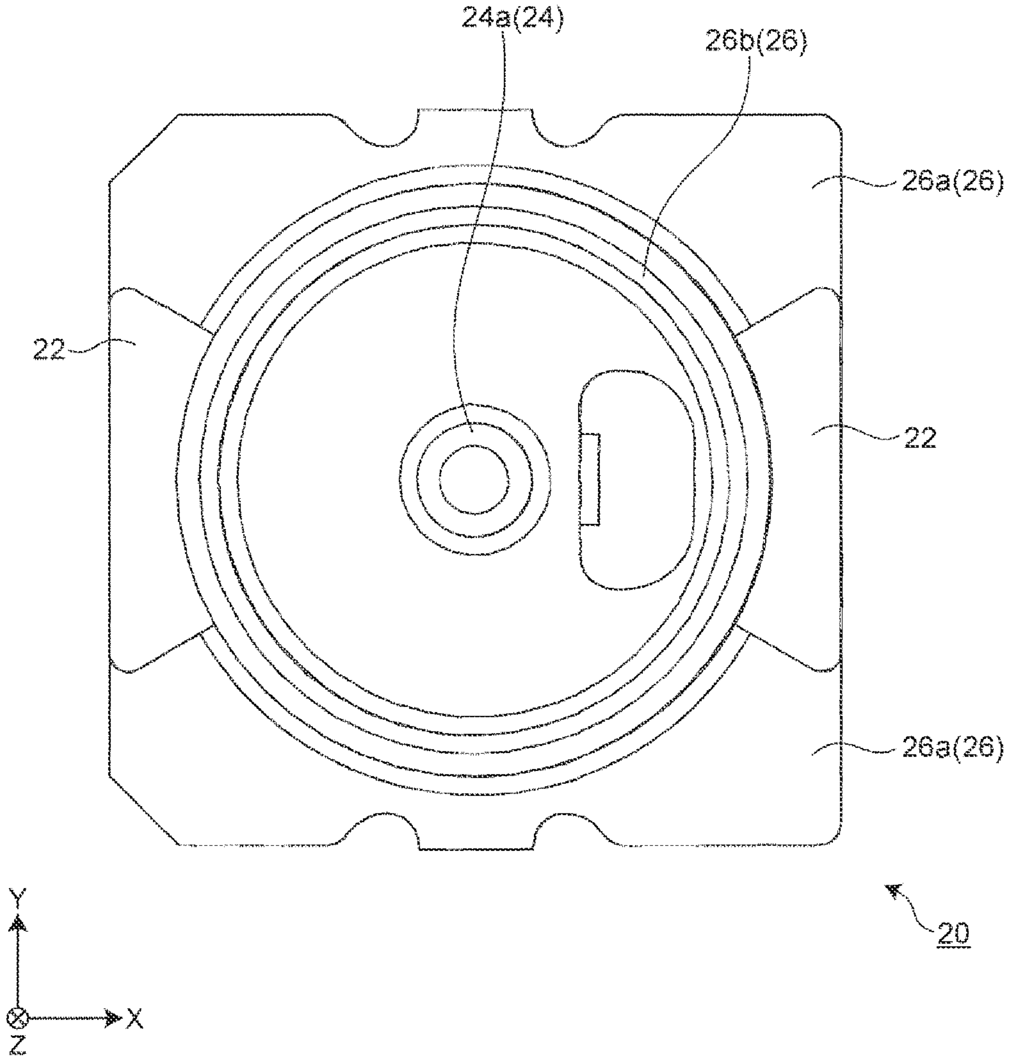
FIG. 5 is a plan view of the second connector illustrated in FIG. 4.

As illustrated in FIG. 4 and FIG. 5, the second connector 20 serving as a mating connector of the first connector 10 includes the second inner terminal (center pin) 24, the second outer terminal 26, and a second insulation member (resin mold) 22 disposed between the second inner terminal 24 and the second outer terminal 26.

As illustrated in FIG. 8, the second inner terminal 24 is a terminal connected to a signal land portion 56 of the circuit board 50. The second inner terminal 24 is electrically insulated from the second outer terminal 26 by the second insulation member 22.

The second inner terminal 24 is configured of a member having conductivity. The second inner terminal 24 is made of one metal plate such as a copper alloy material, for example, and is plated with nickel and gold on the surface thereof. The second inner terminal 24 is integrated with the second insulation member 22 by insert molding. With the use of the stated configuration, positioning between the second insulation member 22 and the second inner terminal 24 may accurately be performed.

The second inner terminal 24 includes the second inner contact portion 24*a* and a second inner mount portion 24*b*. As illustrated in FIG. 8, the second inner terminal 24 is bent in an L-shape in a sectional view.

The second inner contact portion 24*a* extends in the plug-unplug direction (Z axis direction). The second inner contact portion 24*a* has a substantially cylindrical shape. The second inner contact portion 24*a* is in contact with and is electrically coupled to the first inner contact portion 14*a* of the first inner terminal 14 of the first connector 10. The second inner contact portion 24*a* illustrated in FIG. 4 and FIG. 5 is configured as a male type (pin type) having a contact surface on an outer peripheral portion thereof. As illustrated in FIG. 8, the second inner mount portion 24*b* is electrically connected to the signal land portion 56 of the circuit board 50 by a conductive material such as solder. Note that the second inner contact portion 24*a* of a female type and the first inner contact portion 14*a* of a male type may be adopted.

Figure 11:
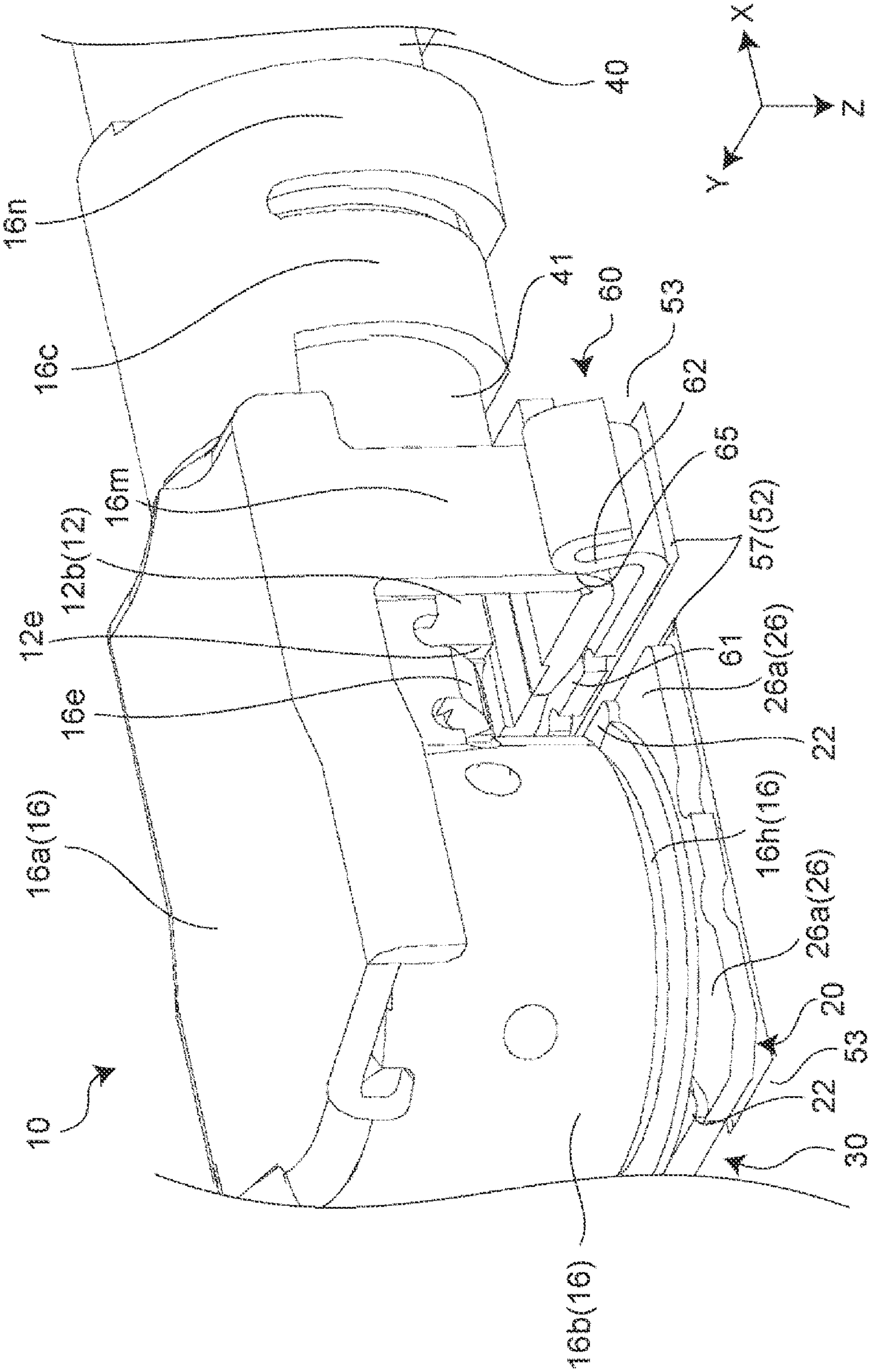
FIG. 11 is a perspective view illustrating a ground coupling structure in a coaxial connector set according to a first embodiment, in which the interposing member is disposed in an interposing manner and the second connector is mounted on a circuit board.

As illustrated in FIG. 11, the second outer terminal 26 is a terminal connected to a ground land portion 57 of the circuit board 50. The second outer terminal 26 is configured of a member having conductivity. The second outer terminal 26 is made of one metal plate such as a copper alloy material, for example, and is plated with nickel and gold on the surface thereof. The second outer terminal 26 is integrated with the second insulation member 22 by insert molding. With the use of the stated configuration, positioning between the second insulation member 22 and the second outer terminal 26 may accurately be performed.

The second outer terminal 26 includes the second outer mount portion 26*a* and the second outer contact portion 26*b*. As illustrated in FIG. 11, the second outer mount portion 26*a* is electrically connected to the ground land portion 57 of the circuit board 50 by a conductive material such as solder.

The second outer contact portion 26*b* extends in the plug-unplug direction (Z axis direction). The second outer contact portion 26*b* has a substantially cylindrical shape. The second outer contact portion 26*b* is coaxially disposed with the second inner contact portion 24*a*. The second outer contact portion 26*b* is in contact with and is electrically coupled to the first outer contact portion 16*b* of the first outer terminal 16 of the first connector 10. A fitting recessed portion 26*h* is formed on an outer peripheral surface of the second outer contact portion 26*b*. When the first connector 10 is fitted to the second connector 20, the fitting recessed portion 26*h* of the second outer contact portion 26*b* fits with a fitting projection portion 16*h* of the first outer contact portion 16*b*.

First Embodiment

Referring to FIG. 9 to FIG. 12, a ground coupling structure in the coaxial connector set 30 according to a first embodiment will be described.

Figure 9:
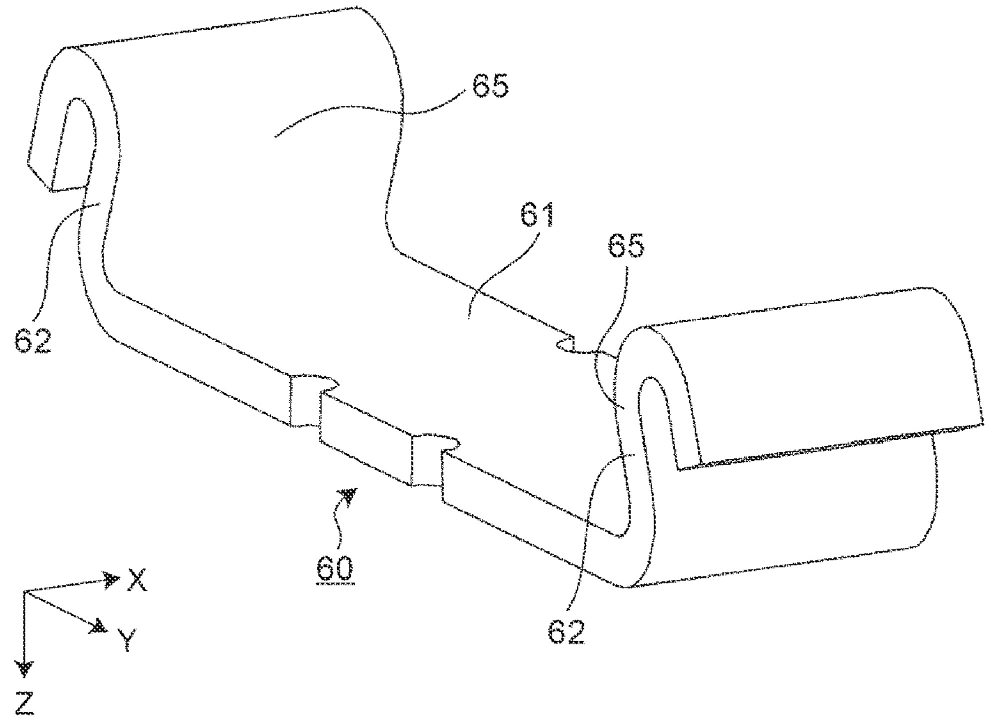
FIG. 9 is a perspective view of an interposing member.
Figure 10:
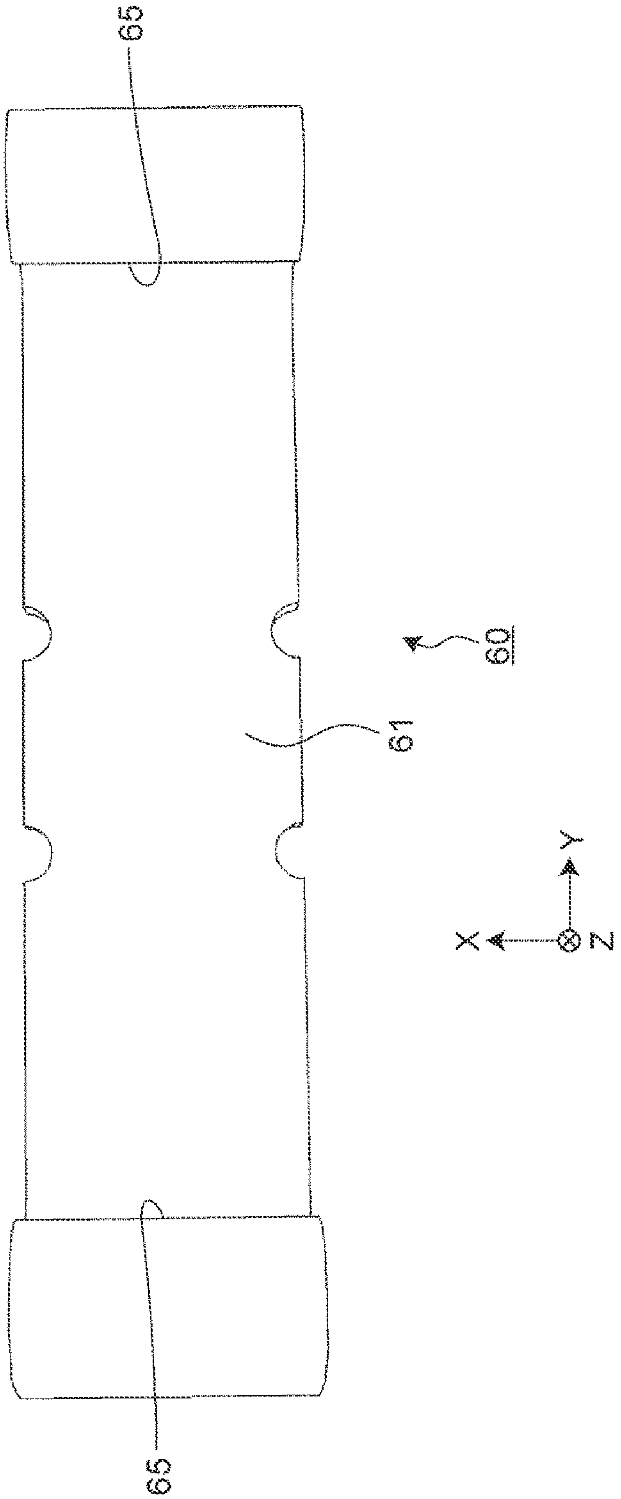
FIG. 10 is a plan view of the interposing member illustrated in FIG. 9.
Figure 12:
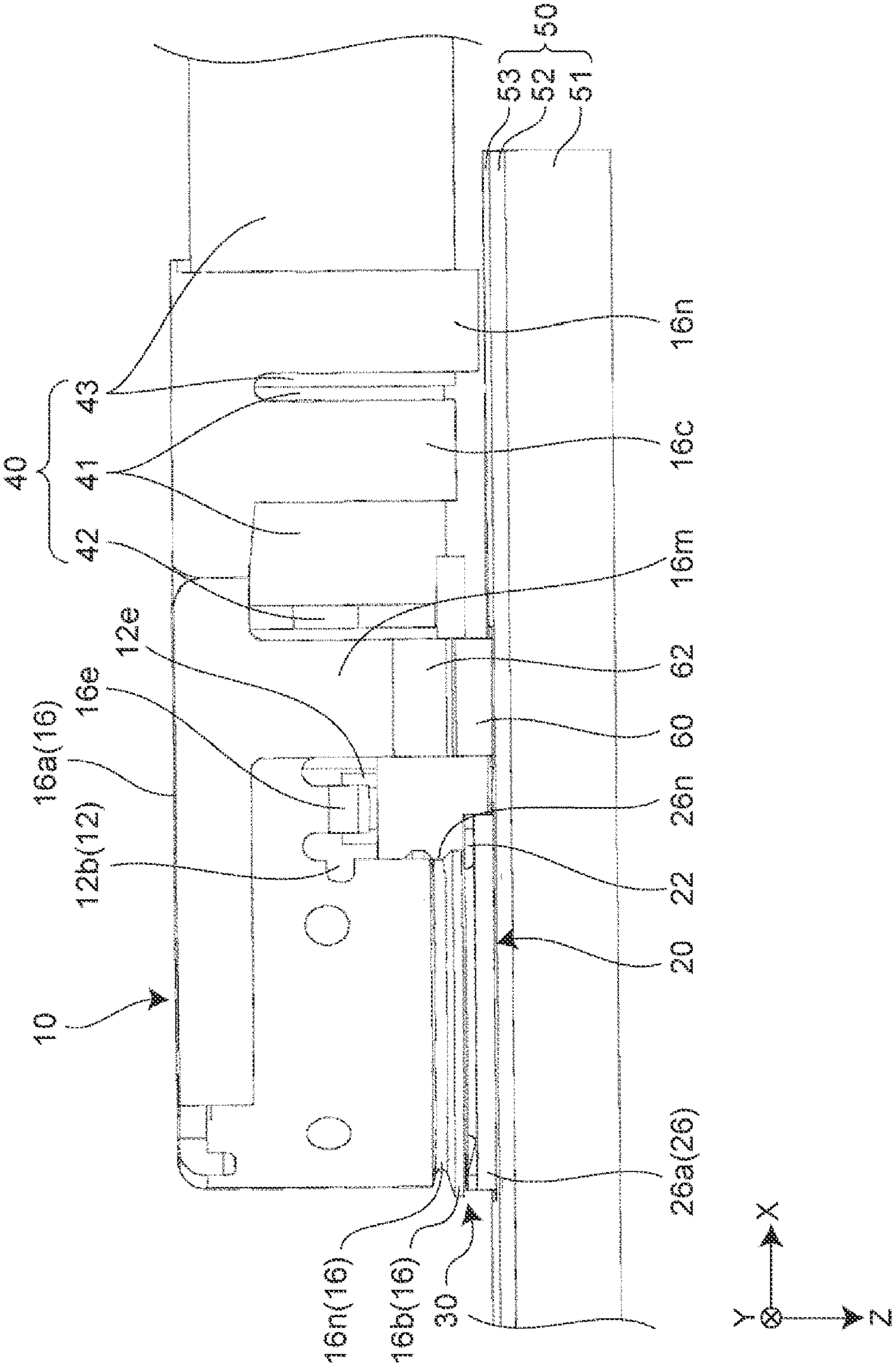
FIG. 12 is a side view of the ground coupling structure in the coaxial connector set illustrated in FIG. 11.

FIG. 9 is a perspective view of an interposing member 60. FIG. 10 is a plan view of the interposing member 60 illustrated in FIG. 9. FIG. 11 is a perspective view illustrating the ground coupling structure in the coaxial connector set 30 according to the first embodiment, in which the interposing member 60 is disposed in an interposing manner, and the second connector 20 is mounted on the circuit board 50. FIG. 12 is a side view of the ground coupling structure in the coaxial connector set 30 illustrated in FIG. 11.

As illustrated in FIG. 9 and FIG. 10, the interposing member 60 has a plate-shaped body 61, two elastic support portions 62 having a shape curved in an inverted J-shape from an end portion of the body 61, and a contact portion 65 formed on an inner surface of the elastic support portions 62. The separation distance between the two elastic support portions 62 in the width direction (Y axis direction) is sized to receive and elastically support a portion of the tip surrounding portion 16*m* in the width direction (Y axis direction). The elastic supporting force by the two elastic support portions 62 acts in the width direction (Y axis direction). The elastic support portion 62 having the contact portion 65 has an elastic support function and an electrical coupling function.

The interposing member 60 is configured of a separate member having conductivity and elasticity, and is made of one metal plate such as a copper alloy material, for example. The surfaces of the contact portion 65 and the vicinity portion thereof are plated with nickel and gold. Since the contact portion 65 is provided on the elastic support portion 62 curved in an inverted J-shape, the contact portion 65 comes into contact by a curved surface.

As illustrated in FIG. 11, the interposing member 60 is electrically connected to the ground land portion 57 of the circuit board 50 by a conductive material such as solder in a state in which the body 61 extends in the width direction (Y axis direction). Further, the interposing member 60 is mounted and fixed to the ground land portion 57 of the circuit board 50. At the same time, the second outer mount portion 26*a* of the second connector 20 is electrically connected to the ground land portion 57 of the circuit board 50 by a conductive material such as solder. That is, the second connector 20 is mounted and fixed to the ground land portion 57 of the circuit board 50.

In the stated state, the fitting operation is performed by moving the first connector 10 toward the second connector 20 in the plug-unplug direction (Z axis direction). At this time, the first outer contact portion 16*b* of the first connector 10 and the second outer contact portion 26*b* of the second connector 20 are engaged with each other, and the first outer contact portion 16*b* and the second outer contact portion 26*b* are electrically coupled. At the same time, the tip surrounding portion 16*m* of the first connector 10 and the two elastic support portions 62 of the interposing member 60 are engaged with each other, and the two contact portions 65 of the interposing member 60 elastically come into contact with the side surfaces of the tip surrounding portion 16*m*. With this, the tip surrounding portion 16*m* and the two contact portions 65 are electrically coupled.

Incidentally, even when the first outer contact portion 16*b* and the tip surrounding portion 16*m* are connected to the same ground, a bypass connection path detouring along the first outer terminal 16 is formed between the first outer contact portion 16*b* and the tip surrounding portion 16*m* in a radio frequency band. With this, an electrical potential difference is generated between the first outer contact portion 16*b* and the tip surrounding portion 16*m* in the first outer terminal 16; and this may lead to radiation of noise, and stable signal transmission in a radio frequency band may be disturbed.

The interposing member 60 disposed as a separate member between the tip surrounding portion 16*m* of the first connector 10 and the ground land portion 57 of the circuit board 50 serves as a shortcut coupling path or a coupling portion that couples the tip surrounding portion 16*m* and the ground land portion (ground coupling portion) 57 of the circuit board 50. Accordingly, since the ground coupling portion 57 of the circuit board 50 and the tip surrounding portion 16*m* of the first outer terminal 16 are coupled with a short distance by the interposing member 60 serving as the shortcut coupling path or the coupling portion, stable signal transmission may be performed in a radio frequency band (megahertz band or gigahertz band, for example). This is because the generation of the electrical potential difference between the tip surrounding portion 16*m* and the ground coupling portion 57 may be suppressed by the shortcut coupling path or the coupling portion.

Second Embodiment

Figure 13:
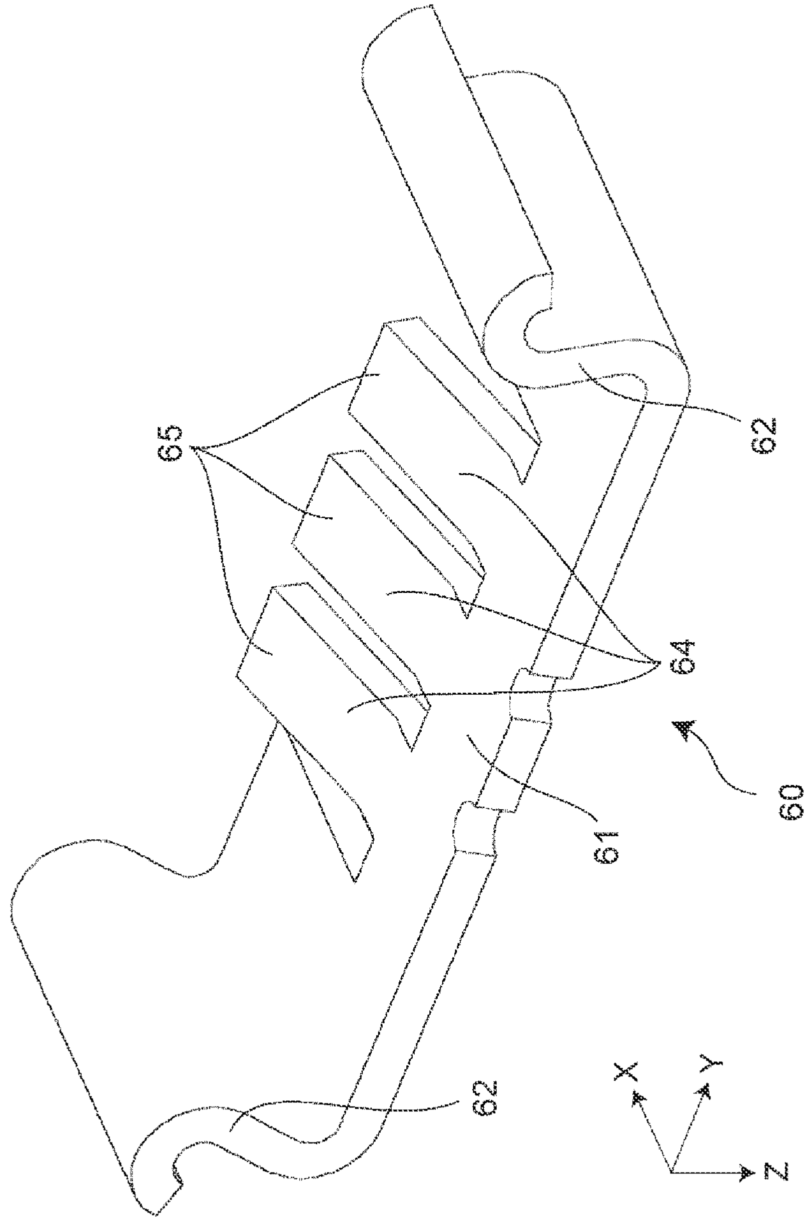
FIG. 13 is a perspective view of an interposing member according to a second embodiment.
Figure 14:
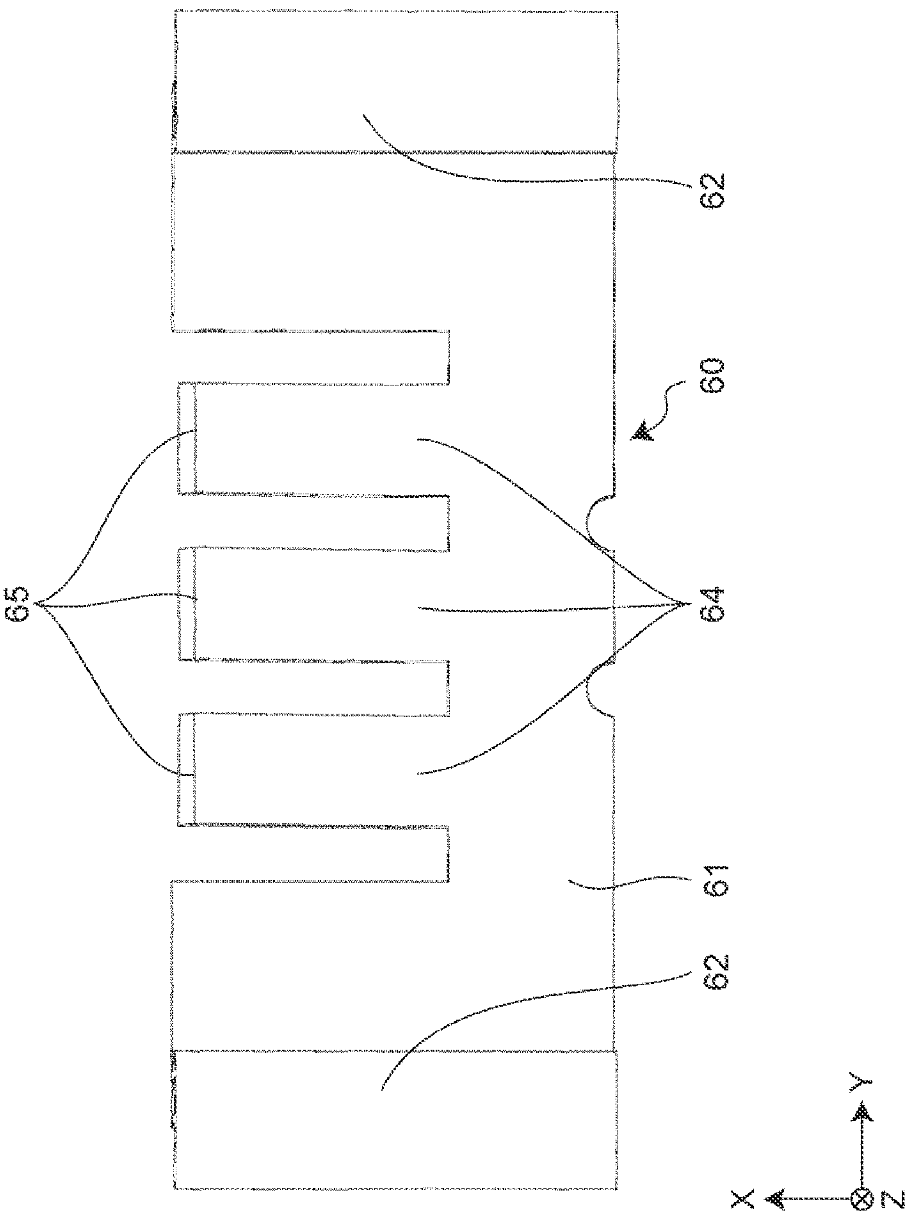
FIG. 14 is a plan view of the interposing member illustrated in FIG. 13.

Referring to FIG. 13 and FIG. 14, a ground coupling structure in the coaxial connector set 30 according to a second embodiment will be described. The ground coupling structure in the coaxial connector set 30 according to the second embodiment has the same configuration as that in the first embodiment except that the positions of the contact portions 65 of the interposing member 60 are different from those in the first embodiment. Accordingly, differences from the first embodiment will mainly be described.

FIG. 13 is a perspective view of the interposing member 60 according to the second embodiment. FIG. 14 is a plan view of the interposing member 60 illustrated in FIG. 13. The interposing member 60 includes the plate-shaped body 61, the two elastic support portions 62, a plurality of elastic contact portions 64, and the plurality of contact portions 65. The plurality of elastic contact portions 64 are formed by partially cutting out a plurality of positions in one side of the body 61 in the lateral direction (X axis direction) and are supported in a cantilever manner; and because of this, the plurality of elastic contact portions 64 have an elastic urging force. The elastic urging force of the plurality of elastic contact portions 64 acts in the plug-unplug direction (Z axis direction). The elastic contact portion 64 having the contact portion 65 provides an elastic electrical coupling. The plurality of contact portions 65 are formed on the upper surface of the elastic contact portions 64. The surfaces of the contact portions 65 and the vicinity portions thereof are plated with nickel and gold. In the example illustrated in FIG. 13, three elastic contact portions 64 and three contact portions 65 are formed.

Since the contact portion 65 is provided at a line-shaped edge portion of the elastic contact portion 64 extending in the width direction (Y axis direction), the contact portion 65 may provide line-shaped contact. Accordingly, the contact pressure of the contact portion 65 may be increased. Further, it is possible to suppress an increase in the electrical resistance of the contact portion 65 because of the abrasion generated by the plug-unplug operation of the connector, as compared with the case that the contact portion 65 is provided in the elastic support portion 62.

The fitting operation is performed by moving the first connector 10 toward the second connector 20 in the plug-unplug direction (Z axis direction). At this time, the first outer contact portion 16*b* of the first connector 10 and the second outer contact portion 26*b* of the second connector 20 are engaged with each other, and the first outer contact portion 16*b* and the second outer contact portion 26*b* are electrically coupled. At the same time, the tip surrounding portion 16*m* of the first connector 10 and the two elastic support portions 62 of the interposing member 60 are engaged with each other. At this time, the three contact portions 65 of the interposing member 60 elastically come into contact with the bottom surface of the tip surrounding portion 16*m*. With this, a stable electrical coupling is achieved between the tip surrounding portion 16*m* and the three contact portions 65.

The interposing member 60 disposed as a separate member between the tip surrounding portion 16*m* of the first connector 10 and the ground land portion 57 of the circuit board 50 serves as a shortcut coupling path or a coupling portion that couples the tip surrounding portion 16*m* and the ground land portion (ground coupling portion) 57 of the circuit board 50. Accordingly, since the ground coupling portion 57 of the circuit board 50 and the tip surrounding portion 16*m* of the first outer terminal 16 are coupled with a short distance by the interposing member 60 serving as the shortcut coupling path or the coupling portion, stable signal transmission may be performed in a radio frequency band (megahertz band or gigahertz band, for example). This is because the generation of the electrical potential difference between the tip surrounding portion 16*m* and the ground coupling portion 57 may be suppressed by the shortcut coupling path or the coupling portion.

Third Embodiment

Figure 15:
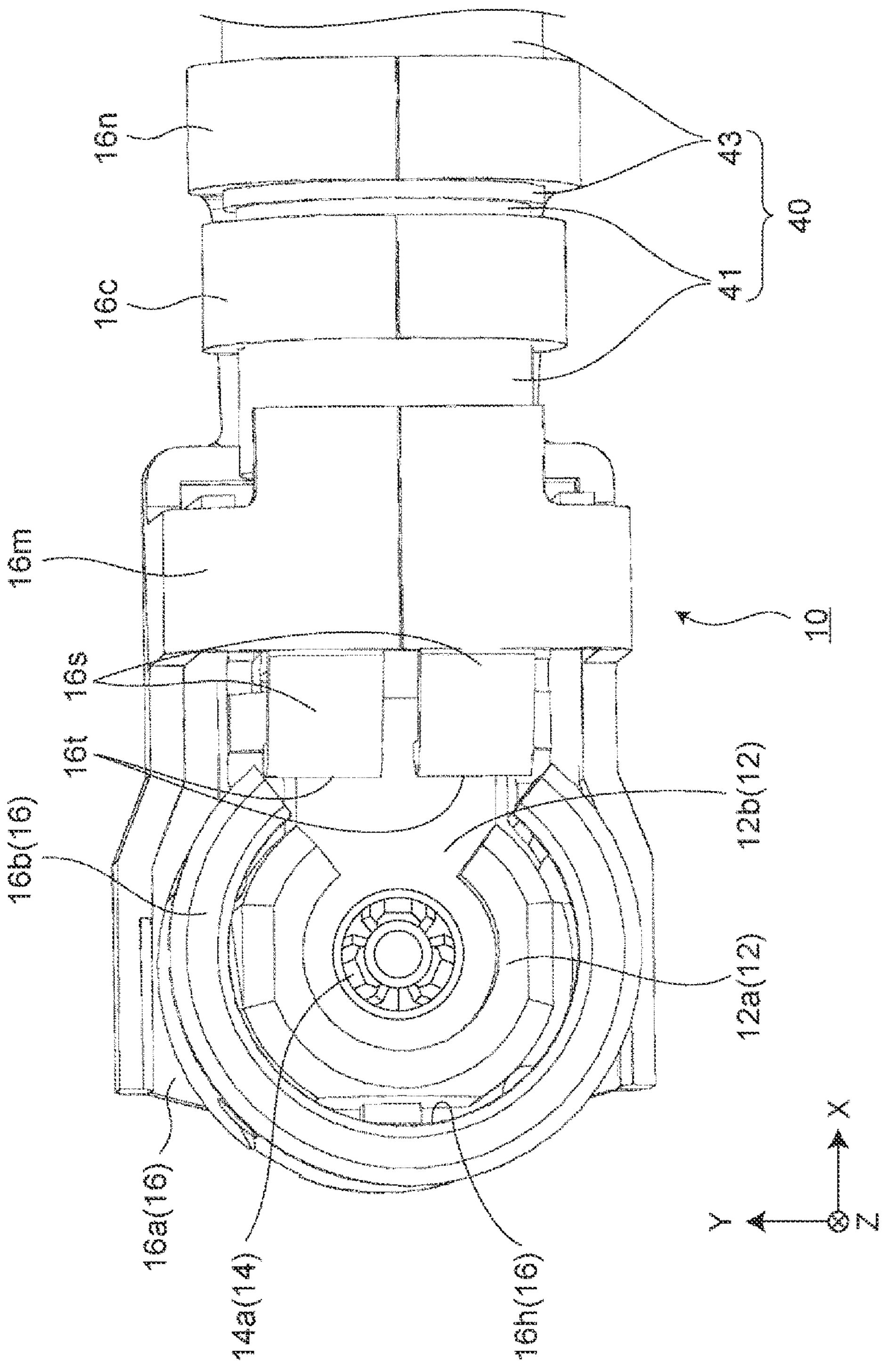
FIG. 15 is a plan view of a first connector with a coaxial cable according to a third embodiment.
Figure 16:
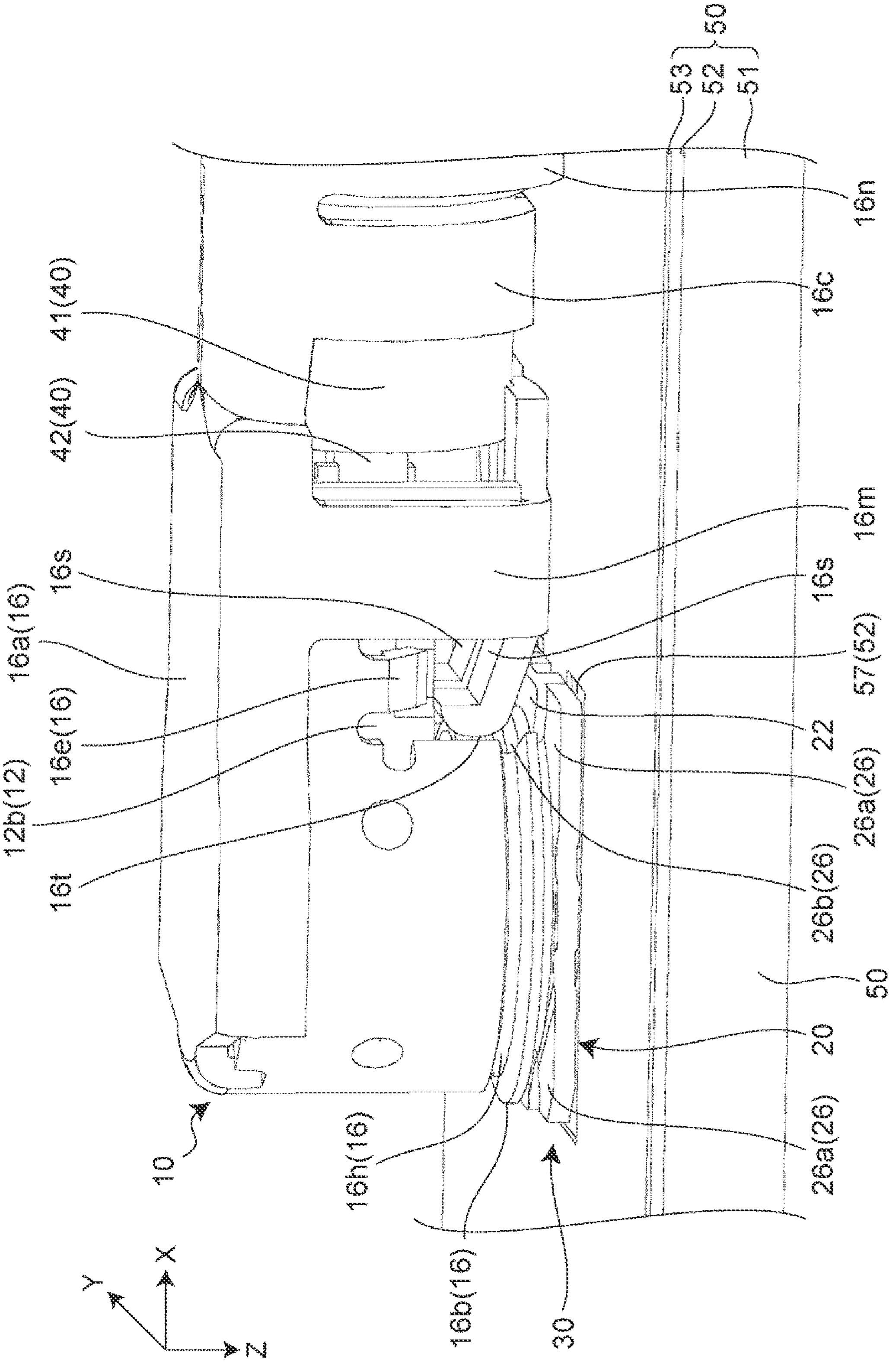
FIG. 16 is a perspective view illustrating a ground coupling structure in a coaxial connector set according to the third embodiment, in which a bridge coupling portion is disposed and a second connector is mounted on a circuit board.
Figure 17:
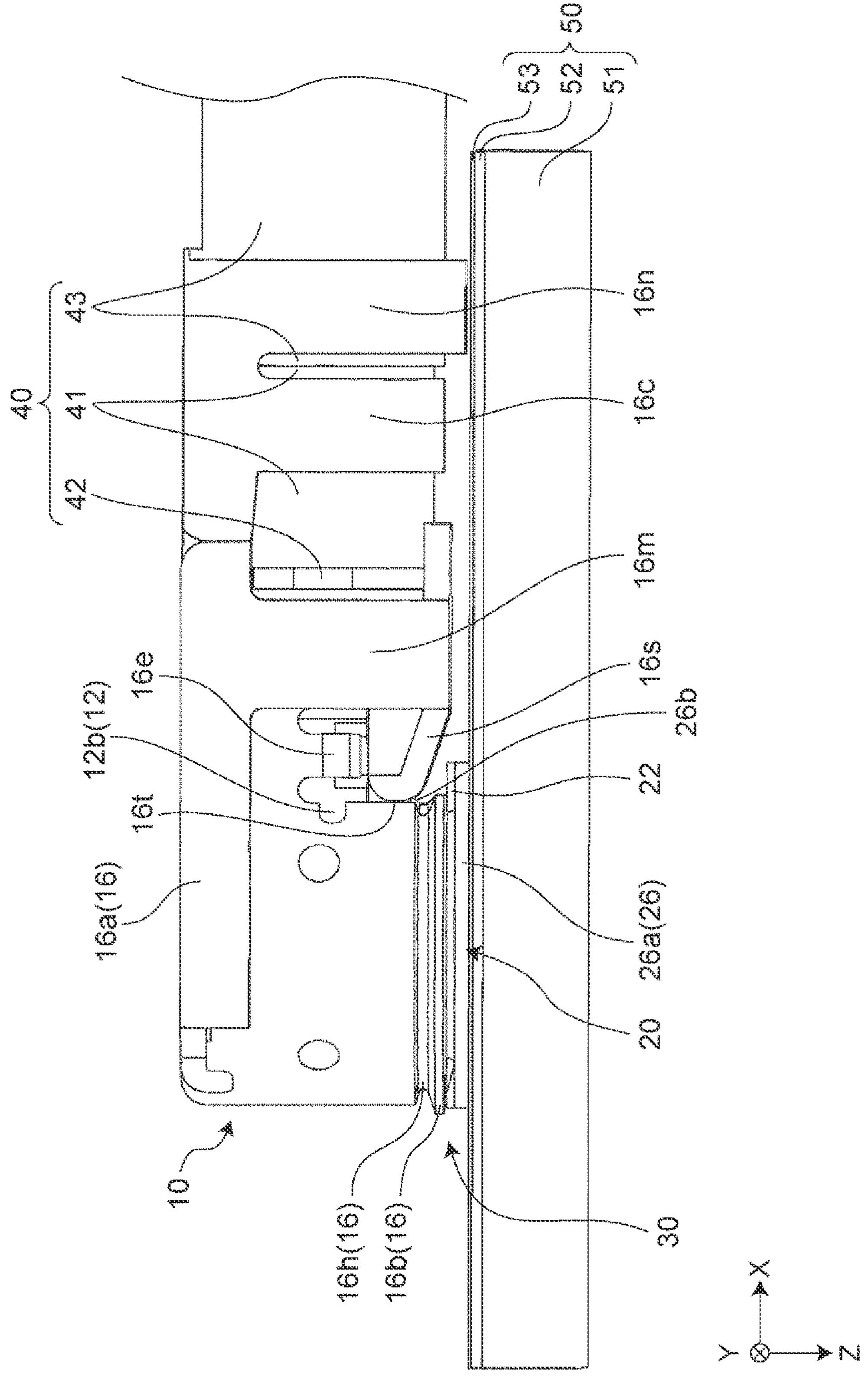
FIG. 17 is a side view of the ground coupling structure in the coaxial connector set illustrated in FIG. 16.

Referring to FIG. 15 to FIG. 17, a ground coupling structure in the coaxial connector set 30 according to a third embodiment will be described. The ground coupling structure in the coaxial connector set 30 according to the third embodiment is characterized by including a bridge coupling portion 16*s*; and the bridge coupling portion 16*s* is the shortcut coupling path coupling the tip surrounding portion 16*m* and the second outer contact portion 26*b* or the second outer mount portion 26*a*.

FIG. 15 is a plan view of the first connector 10 with the coaxial cable 40 according to the third embodiment. FIG. 16 is a perspective view illustrating the ground coupling structure in the coaxial connector set 30 according to the third embodiment, in which the bridge coupling portion 16*s* is disposed and the second connector 20 is mounted on the circuit board 50. FIG. 17 is a side view of the ground coupling structure in the coaxial connector set 30 illustrated in FIG. 16.

As illustrated in FIG. 15 to FIG. 17, the two bridge coupling portions 16*s* are disposed to the tip surrounding portion 16*m*. Specifically, the bridge coupling portion 16*s* extends in a plate shape in the lateral direction (X axis direction) from the side end surface of the tip surrounding portion 16*m* on the side of the first outer contact portion 16*b* to the second outer contact portion 26*b*. That is, the bridge coupling portion 16*s* is provided as part of the tip surrounding portion 16*m*.

A portion of the side of the second outer terminal 26 to be coupled to the bridge coupling portion 16*s* is positioned to face the tip surrounding portion 16*m*, and is electrically connected to the ground land portion (ground coupling portion) 57 of the circuit board 50. Specifically, the portion of the side of the second outer terminal 26 to be coupled to the bridge coupling portion 16*s* is the side surface of the second outer contact portion 26*b* on the side of the coaxial cable 40, or the upper surface of the second outer mount portion 26*a* on the side of the coaxial cable 40.

The bridge coupling portion 16*s* has an L-shape in a side view from the width direction (Y axis direction). The tip portion of the bridge coupling portion 16*s* on the side of the first outer contact portion 16*b* has a contact portion 16*t*; and the contact portion 16*t* is provided on the side surface of the tip portion on the side of the first outer contact portion 16*b* or on the lower surface of the tip portion on the side of the second outer mount portion 26*a*. The surfaces of the contact portion 16*t* and the vicinity portion thereof are plated with nickel and gold.

The bridge coupling portion 16*s* is supported in a cantilever manner at the side end surface of the tip surrounding portion 16*m* on the side of the first outer contact portion 16*b*, and therefore has an elastic urging force. The elastic urging force of the bridge coupling portion 16*s* acts in the plug-unplug direction (Z axis direction). The bridge coupling portion 16*s* having the contact portion 16*t* provides an elastic contact, and therefore provides a stable electrical coupling.

The fitting operation is performed by moving the first connector 10 toward the second connector 20 in the plug-unplug direction (Z axis direction). At this time, the first outer contact portion 16*b* of the first connector 10 and the second outer contact portion 26*b* of the second connector 20 are engaged with each other, and the first outer contact portion 16*b* and the second outer contact portion 26*b* are electrically coupled. At the same time, the contact portions 16*t* of the two bridge coupling portions 16*s* elastically come into contact with the side surface of the second outer contact portion 26*b* on the side of the coaxial cable 40. With this, a stable electrical coupling is achieved between the tip surrounding portion 16*m* and the second outer contact portion 26*b*.

The bridge coupling portion 16*s* disposed between the tip surrounding portion 16*m* of the first connector 10 and the second outer contact portion 26*b* of the second connector 20 serves as a shortcut coupling path coupling the tip surrounding portion 16*m* and the second outer contact portion 26*b*. Accordingly, since the second outer contact portion 26*b* and the tip surrounding portion 16*m* of the first outer terminal 16 are coupled with a short distance by the bridge coupling portion 16*s* serving as the shortcut coupling path, stable signal transmission may be performed in a radio frequency band (megahertz band or gigahertz band, for example). This is because the generation of the electrical potential difference between the tip surrounding portion 16*m* and the second outer contact portion 26*b* may be suppressed by the shortcut coupling path.

Because of the shape of the bridge coupling portion 16*s*, even in a case where the first connector 10 is fitted to the second connector 20 such that the first connector 10 shifts in any direction in a direction (X-Y plane direction) orthogonal to the plug-unplug direction (Z axis direction), the connectivity of the shortcut coupling path is maintained.

Note that the following aspect may be adopted. The tip portion of the bridge coupling portion 16*s* on the side of the first outer contact portion 16*b* has the contact portion 16*t* on a lower surface thereof on the side of the second outer mount portion 26*a*, and elastically comes into contact with the upper surface of the second outer mount portion 26*a* on the side of the coaxial cable 40. With this, stable electrical coupling may be achieved between the tip surrounding portion 16*m* and the second outer mount portion 26*a*.

Further, it is also possible to adopt an aspect in which the two bridge coupling portions 16*s* are disposed to the second outer mount portion 26*a*. Specifically, the following aspect may be adopted. The two bridge coupling portions 16*s* extend in a plate shape in the lateral direction (X axis direction) from the upper surface of the second outer mount portion 26*a* on the side of the coaxial cable 40 to the tip surrounding portion 16*m*. That is, the bridge coupling portion 16*s* may be provided as part of the second outer mount portion 26*a*. The tip portion of the stated bridge coupling portion 16*s* on the side of the coaxial cable 40 may have a contact portion, and may elastically come into contact with the upper surface, the lower surface, or the side end surface of the tip surrounding portion 16*m*. The bridge coupling portion 16*s* serving as the shortcut coupling path or the coupling portion achieves a stable electrical coupling between the tip surrounding portion 16*m* and the second outer mount portion 26*a*.

Furthermore, it is also possible to adopt an aspect in which the two bridge coupling portions 16*s* are disposed to the second outer contact portion 26*b*. Specifically, the following aspect may be adopted. The two bridge coupling portions 16*s* extend in a plate shape in the lateral direction (X axis direction) from the side end portion of the second outer contact portion 26*b* on the side of the coaxial cable 40 to the tip surrounding portion 16*m*. That is, the bridge coupling portion 16*s* may be provided as part of the second outer contact portion 26*b*. The tip portion of the stated bridge coupling portion 16*s* on the side of the coaxial cable 40 may have a contact portion, and may elastically come into contact with the upper surface, the lower surface, or the side end surface of the tip surrounding portion 16*m*. Since the bridge coupling portion 16*s* serving as the shortcut coupling path electrically couples the tip surrounding portion 16*m* of the first outer terminal 16 and the second outer contact portion 26*b* of the second connector 20 with a short distance, stable signal transmission may be performed in a radio frequency band (megahertz band or gigahertz band, for example).

Fourth Embodiment

Figure 18:
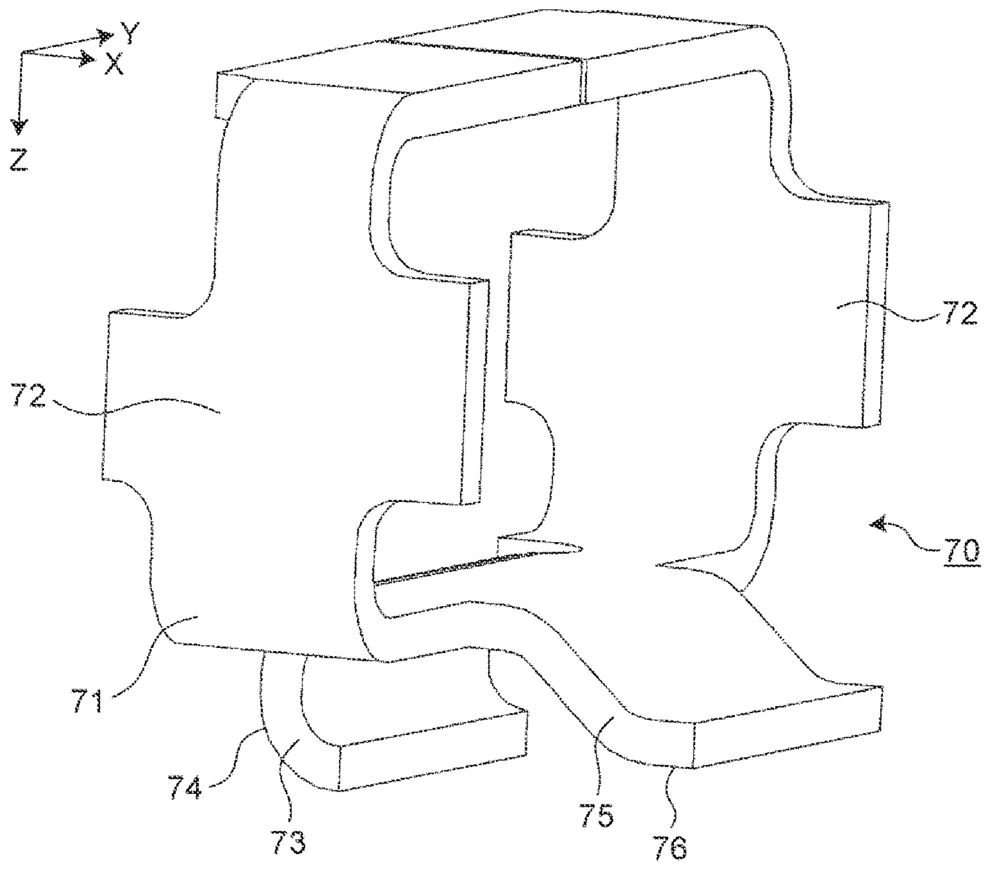
FIG. 18 is a perspective view of a shield member.
Figure 19:
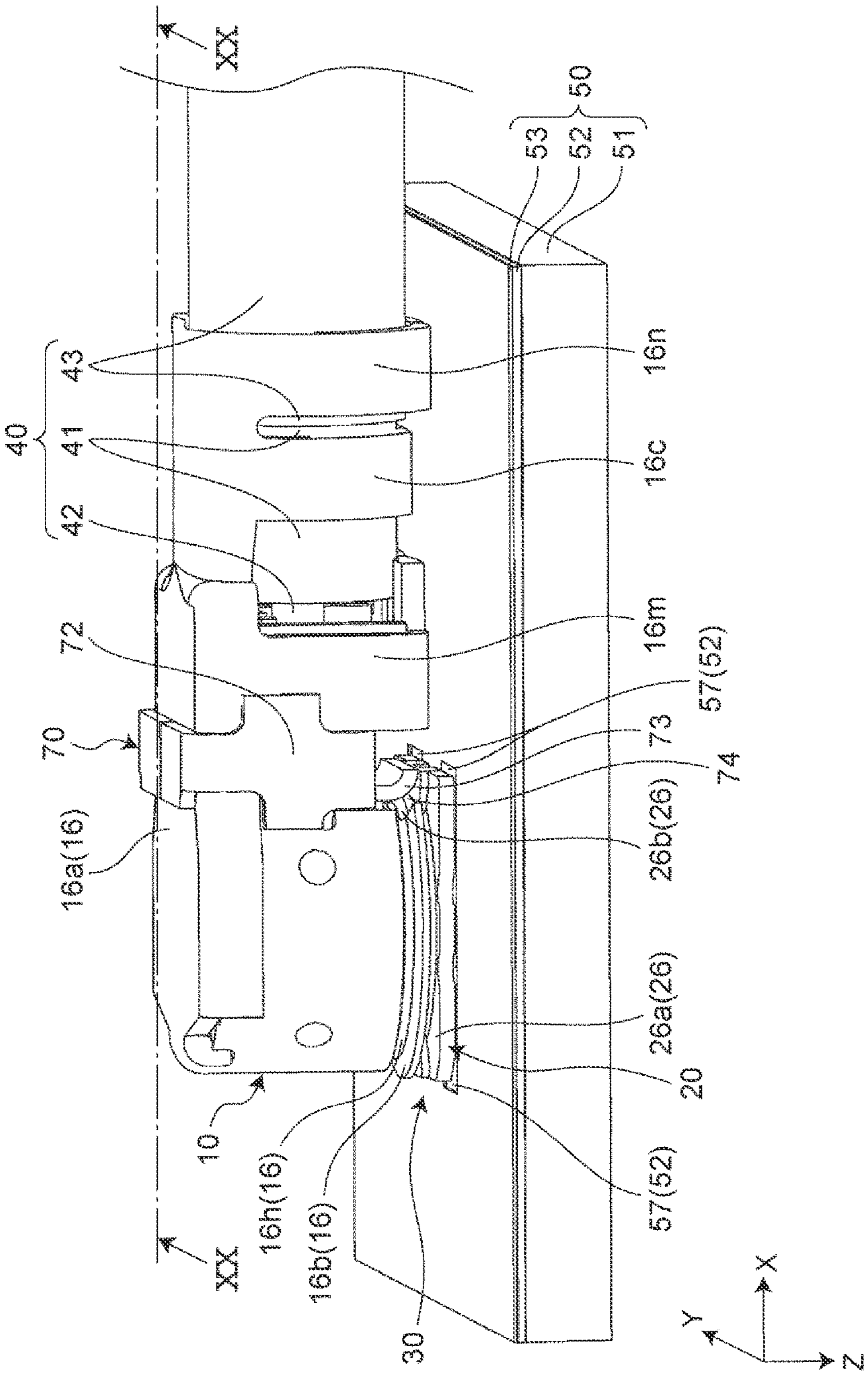
FIG. 19 is a perspective view illustrating a ground coupling structure in a coaxial connector set according to a fourth embodiment, in which the shield member is disposed and a second connector is mounted on a circuit board.
Figure 20:
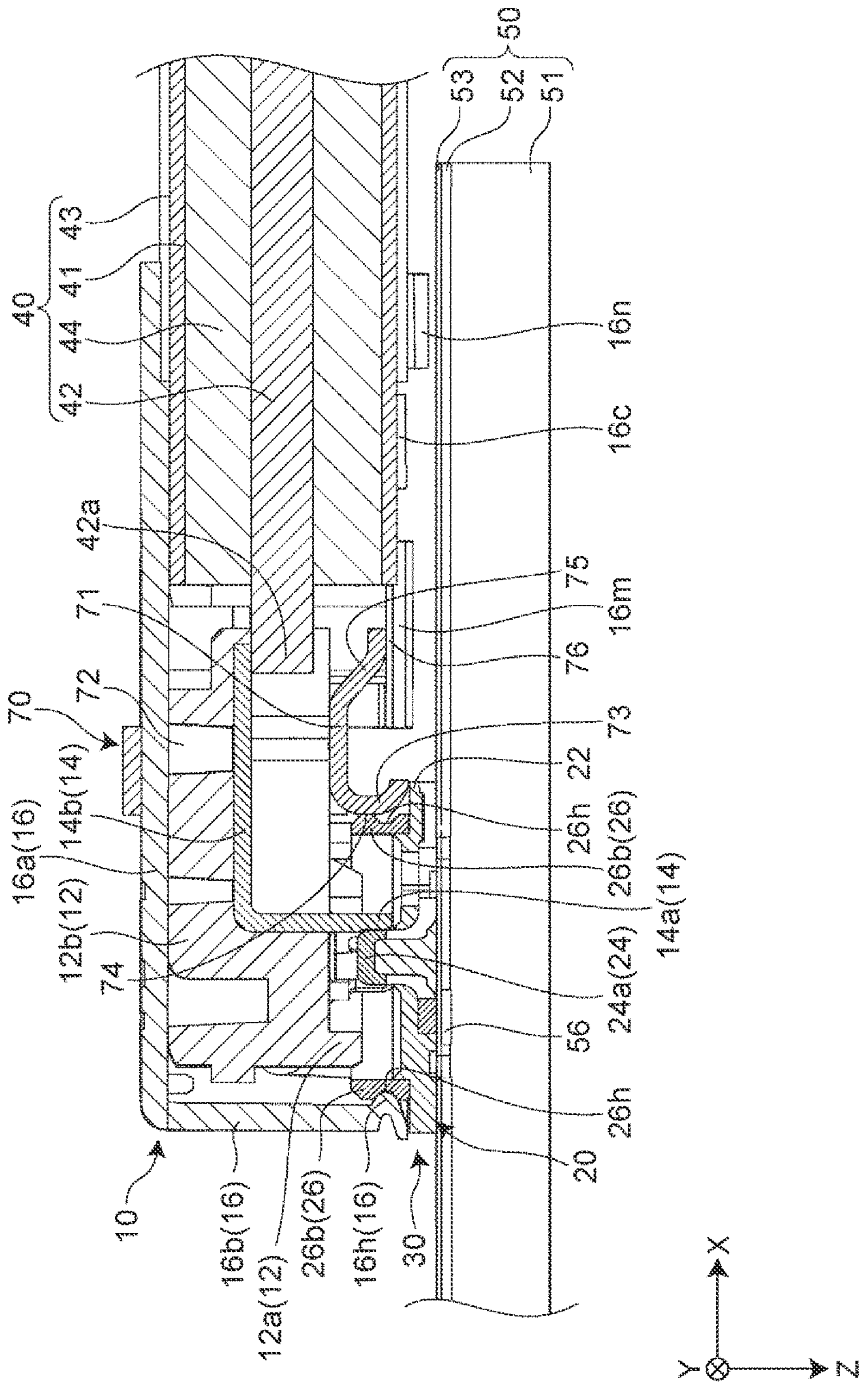
FIG. 20 is a sectional view taken along a line XX-XX in FIG. 19.

Referring to FIG. 18 to FIG. 20, a ground coupling structure in the coaxial connector set 30 according to a fourth embodiment will be described. The ground coupling structure in the coaxial connector set 30 according to the fourth embodiment is characterized by including a shield member 70; the shield member 70 being the shortcut coupling path coupling the tip surrounding portion 16*m* and the second outer contact portion 26*b* or the second outer mount portion 26*a*.

FIG. 18 is a perspective view of the shield member 70. FIG. 19 is a perspective view illustrating a ground coupling structure in the coaxial connector set 30 according to the fourth embodiment, in which the shield member 70 is disposed and the second connector 20 is mounted on the circuit board 50. FIG. 20 is a sectional view taken along a line XX-XX in FIG. 19.

As illustrated in FIG. 18, the shield member 70 includes a body 71, a shield portion 72, a first elastic contact portion 73, a first contact portion 74, a second elastic contact portion 75, and a second contact portion 76. The shield member 70 is configured of a pair of plate-shaped members formed to face each other in the width direction (Y axis direction). The shield member 70 is configured of a member having conductivity and elasticity, and is made of one metal plate such as a copper alloy material, for example. By bending toward the virtual center line, the shield member 70 is engaged with the upper surface of the outer conductor connection portion 16*a*. The bent shield member 70 has a rectangular shape in a sectional view in the width direction (Y axis direction). The upper surface portion, the side surface portion, and the lower surface portion of the rectangular shield member 70 serve as the shield portion 72 covering a gap formed between the first outer contact portion 16*b* and the tip surrounding portion 16*m*. By covering the gap formed between the first outer contact portion 16*b* and the tip surrounding portion 16*m* with the shield portion 72, the noise go in and out of the gap may be reduced.

The first elastic contact portion 73 and the second elastic contact portion 75 are disposed on the lower surface portion of the shield member 70. The first elastic contact portion 73 extends from a side end surface of the body 71 on the side of the first outer contact portion 16*b*, and has a shape curved in a J-shape. The first elastic contact portion 73 includes the first contact portion 74 on the surface thereof on the side of the first outer contact portion 16*b*. The surfaces of the first contact portion 74 and the vicinity portion thereof are plated with nickel and gold. The first elastic contact portion 73 is supported in a cantilever manner at the side end surface of the body 71 on the side of the first outer contact portion 16*b*, and therefore has an elastic urging force. The elastic urging force of the first elastic contact portion 73 acts in the lateral direction (X axis direction). The first elastic contact portion 73 including the first contact portion 74 provides a stable electrical coupling because of the elastic contact.

The second elastic contact portion 75 extends from the side end surface of the body 71 on the side of the coaxial cable 40, and has a shape curved in an S-shape. The second elastic contact portion 75 includes the second contact portion 76 on the surface thereof on the side of the circuit board 50. The surfaces of the second contact portion 76 and the vicinity portion thereof are plated with nickel and gold. The second elastic contact portion 75 is supported in a cantilever manner at the side end surface of the body 71 on the side of the coaxial cable 40, and therefore has an elastic urging force. The elastic urging force of the second elastic contact portion 75 acts in the plug-unplug direction (Z axis direction). The second elastic contact portion 75 including the second contact portion 76 provides a stable electrical coupling because of the elastic contact.

The fitting operation is performed by moving the first connector 10 toward the second connector 20 in the plug-unplug direction (Z axis direction). At this time, the first outer contact portion 16*b* of the first connector 10 and the second outer contact portion 26*b* of the second connector 20 are engaged with each other, and the first outer contact portion 16*b* and the second outer contact portion 26*b* are electrically coupled. Meanwhile, the first contact portion 74 of the first elastic contact portion 73 elastically comes into contact with the side surface of the second outer contact portion 26*b* on the side of the coaxial cable 40, and the second contact portion 76 of the second elastic contact portion 75 elastically comes into contact with the inner surface of the facing wall portion of the tip surrounding portion 16*m* on the side of the circuit board 50. With this, a stable electrical coupling is achieved between the tip surrounding portion 16*m* and the second outer contact portion 26*b*.

The shield member 70 disposed between the tip surrounding portion 16*m* of the first connector 10 and the second outer contact portion 26*b* of the second connector 20 serves as the shortcut coupling path coupling the tip surrounding portion 16*m* and the second outer contact portion 26*b*. Accordingly, since the tip surrounding portion 16*m* of the first outer terminal 16 and the second outer contact portion 26*b* of the second connector 20 are coupled with a short distance by the shield member 70 serving as the shortcut coupling path, stable signal transmission may be performed in a radio frequency band (megahertz band or gigahertz band, for example). This is because the generation of the electrical potential difference between the tip surrounding portion 16*m* and the second outer contact portion 26*b* may be suppressed by the shortcut coupling path.

Due to the shape of the first elastic contact portion 73 of the shield member 70, even in a case where the first connector 10 is fitted to the second connector 20 such that the first connector 10 shifts in any direction in the direction (X-Y plane direction) orthogonal to the plug-unplug direction (Z axis direction), the connectivity of the shortcut coupling path is maintained.

Note that the following aspect may be adopted. The first elastic contact portion 73 of the shield member 70 may have the first contact portion 74 on the facing surface thereof on the side of the second outer mount portion 26*a*, and elastically come into contact with the upper surface of the second outer mount portion 26*a* on the side of the coaxial cable 40. Since the shield member 70 serving as the shortcut coupling path electrically couples the tip surrounding portion 16*m* of the first outer terminal 16 and the second outer mount portion 26*a* of the second connector 20 with a short distance, stable signal transmission may be performed in a radio frequency band (megahertz band or gigahertz band, for example).

Fifth Embodiment

Figure 21:
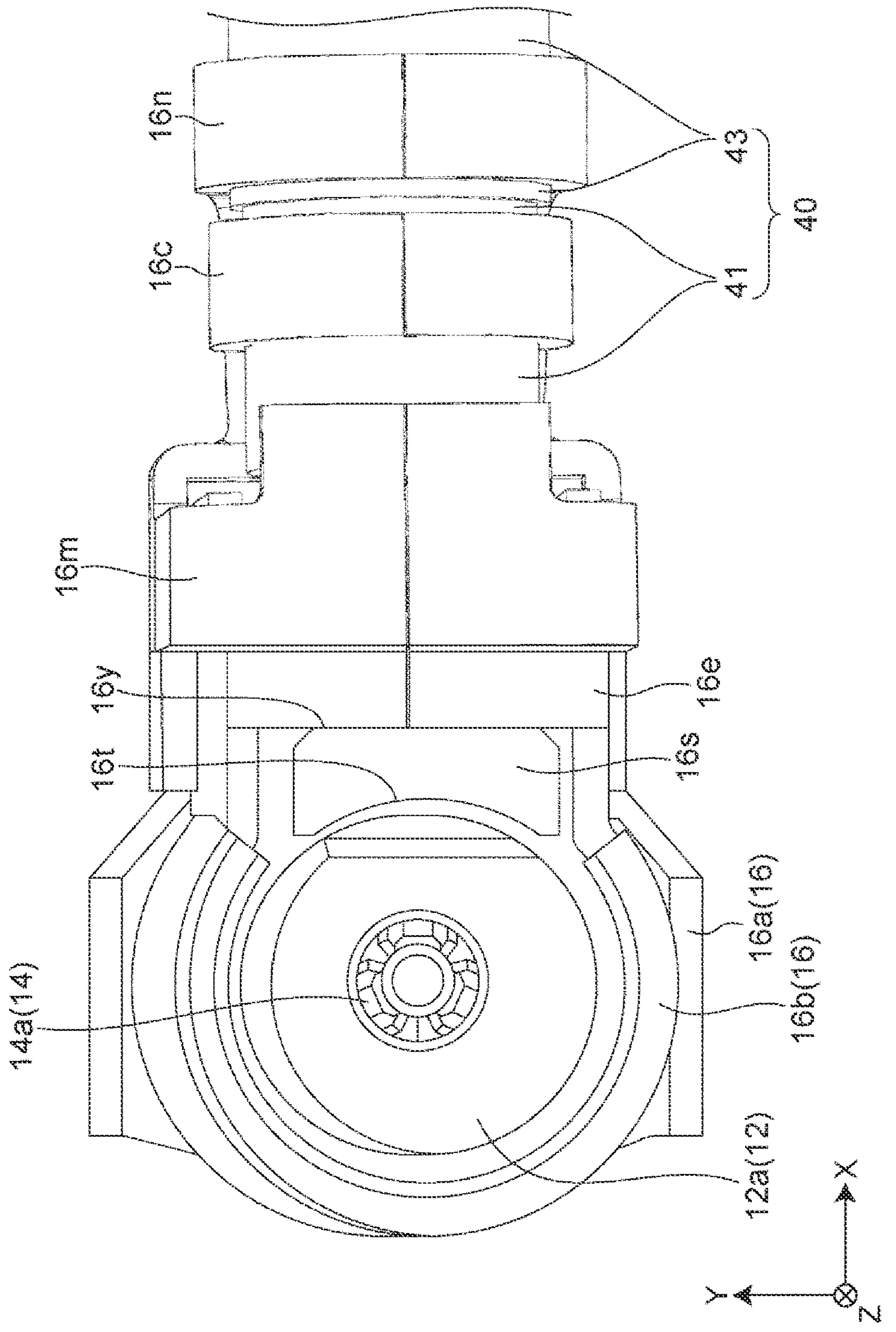
FIG. 21 is a plan view of a first connector with a coaxial cable according to a fifth embodiment.

Referring to FIG. 21, a ground coupling structure in the coaxial connector set 30 according to a fifth embodiment will be described. The ground coupling structure in the coaxial connector set 30 according to the fifth embodiment is characterized by including the bridge coupling portion 16*s*; and the bridge coupling portion 16*s* is the shortcut coupling path or the coupling portion coupling the tip surrounding portion 16*m* and the second outer contact portion 26*b* or the second outer mount portion 26*a*, and is a member separate from the tip surrounding portion 16*m*.

FIG. 21 is a plan view of the first connector 10 with the coaxial cable 40 according to the fifth embodiment. Since the fifth embodiment is a modification of the third embodiment, differences between the two embodiments will mainly described.

As illustrated in FIG. 21, the bridge coupling portion 16*s* is configured as a body separated from the tip surrounding portion 16*m*. The bridge coupling portion 16*s* is a member having conductivity. The bridge coupling portion 16*s* is made of one metal plate such as a copper alloy material, for example, and is plated with nickel and gold on the surface thereof. The bridge coupling portion 16*s* serves as the coupling portion and is positioned closer to the circuit board 50 than the outer conductor connection portion 16*a*, in other words, positioned on the opposite side of the outer conductor connection portion 16*a* (that is, on the side closer to the circuit board 50). The bridge coupling portion 16*s* is a member electrically coupling the tip surrounding portion 16*m* and the second outer terminal 26 or the ground coupling portion 57 without using the outer conductor connection portion 16*a*.

The bridge coupling portion 16*s* extends in a plate shape in the lateral direction (X axis direction) from the retaining portion 16*e* of the first outer contact portion 16*b* to the second outer contact portion 26*b*. One end portion of the bridge coupling portion 16*s* on the side of the tip surrounding portion 16*m* is sandwiched by the retaining portion 16*e* and the center conductor holding portion 12*b* of the first insulation member 12, and is crimped by the retaining portion 16*e*. With this, the bridge coupling portion 16*s* is fixed by the retaining portion 16*e*, and is electrically connected to the retaining portion 16*e*. The retaining portion 16*e* is crimped by the tip surrounding portion 16*m*, and is electrically connected to the tip surrounding portion 16*m*.

The other end portion of the bridge coupling portion 16*s* on the side opposite from the tip surrounding portion 16*m* (that is, the side of the second outer terminal 26) has a shape conforming to the outer shape of the second outer contact portion 26*b*, and serves as the contact portion 16*t*. For example, as illustrated in FIG. 4, in the case that the second outer contact portion 26*b* has a circular shape as viewed from the plug-unplug direction (Z axis direction), the other end portion of the bridge coupling portion 16*s* on the side opposite from the tip surrounding portion 16*m* has an arc shape as viewed from the plug-unplug direction (Z axis direction) as illustrated in FIG. 21. With this, the other end portion of the bridge coupling portion 16*s* is reliably and electrically coupled to the second outer contact portion 26*b*. The contact portion 16*t* of the bridge coupling portion 16*s* comes into contact with and electrically couples to the side surface of the second outer contact portion 26*b* on the side of the coaxial cable 40 or the upper surface of the second outer mount portion 26*a* on the side of the coaxial cable 40.

The bridge coupling portion 16*s* is supported in a cantilever manner at the one end portion thereof on the side of the tip surrounding portion 16*m*, and therefore has an elastic urging force. The elastic urging force of the bridge coupling portion 16*s* acts in the plug-unplug direction (Z axis direction). The bridge coupling portion 16*s* having the contact portion 16*t* provides an elastic contact, and therefore provides a stable electrical coupling. Further, in a side view from the width direction (Y axis direction), a bent portion 16*y* bent in a stepped shape is provided to the bridge coupling portion 16*s* on the side of the tip surrounding portion 16*m*. With this, the elastic contact property and the electrical connectivity are improved.

The bridge coupling portion 16*s* couples the tip surrounding portion 16*m* and the second outer terminal 26 or the ground coupling portion 57 without using the outer conductor connection portion 16*a*, and is positioned closer to the circuit board 50 than the outer conductor connection portion 16*a*. The bridge coupling portion 16*s*, which is disposed between the tip surrounding portion 16*m* of the first connector 10 and the second outer contact portion 26*b* of the second connector 20 and is configured as a separate member, serves as the shortcut coupling path or the coupling portion coupling the tip surrounding portion 16*m* and the second outer contact portion 26*b*. Accordingly, since the second outer contact portion 26*b* and the tip surrounding portion 16*m* of the first outer terminal 16 are coupled with a short distance by the bridge coupling portion 16*s* serving as the shortcut coupling path or the coupling portion, stable signal transmission may be performed in a radio frequency band (megahertz band or gigahertz band, for example). This is because the generation of the electrical potential difference between the tip surrounding portion 16*m* and the second outer contact portion 26*b* may be suppressed by the shortcut coupling path or the coupling portion.

Note that, in the above-described embodiment, the bridge coupling portion 16*s* formed of a separate member is crimped by the retaining portion 16*e*, and is electrically connected to the tip surrounding portion 16*m* using the retaining portion 16*e*. However, it is also possible to adopt a configuration in which the bridge coupling portion 16*s* formed of a separate member is directly electrically connected to the tip surrounding portion 16*m*. That is, it is also possible to adopt a configuration in which the bridge coupling portion 16*s* formed of a separate member is crimped by the tip surrounding portion 16*m* without using the retaining portion 16*e* and is electrically connected to the tip surrounding portion 16*m*. In this case, the bridge coupling portion 16*s* formed of a separate member serves as a coupling portion 16*s* coupling the tip surrounding portion 16*m* and the second outer terminal 26 or the ground coupling portion 57 without using the outer conductor connection portion 16*a*, and the bridge coupling portion 16*s* is positioned closer to the circuit board 50 than the outer conductor connection portion 16*a*. With this, since the bridge coupling portion 16*s* formed of a separate member couples the tip surrounding portion 16*m* of the first outer terminal 16 and the second outer terminal 26 or the ground coupling portion 57 of the circuit board 50 with a short distance, stable signal transmission may be performed in a radio frequency band (megahertz band or gigahertz band, for example).

Although specific embodiments of the present disclosure have been described, the present disclosure is not limited to the above-described embodiments, and various modifications can be made without departing from the scope of the present disclosure.

The present disclosure and embodiments will be summarized as follows.

The ground coupling structure in the coaxial connector set 30 according to an aspect of the present disclosure is characterized as follows. In the coaxial connector set 30 including the first connector 10 to which the coaxial cable 40 having the center conductor 42 and the outer conductor 41 is connected and the second connector 20 mounted on the circuit board 50 having the ground coupling portion 57. The first connector 10 has the first outer terminal 16 connected to the outer conductor 41 and the second connector 20 has the second outer terminal 26 to be coupled to the first outer terminal 16. The first outer terminal 16 includes the outer conductor clamp portion 16*c* clamping the outer conductor 41, the first outer contact portion 16*b* to be coupled to the second outer terminal 26, and the tip surrounding portion 16*m* positioned between the outer conductor clamp portion 16*c* and the first outer contact portion 16*b* and surrounding the tip portion 42*a* of the center conductor 42. The second outer terminal 26 includes the second outer contact portion 26*b* to be coupled to the first outer contact portion 16*b* and the second outer mount portion 26*a* mounted on the ground coupling portion 57. The shortcut coupling paths 16*s*, 60, and 70 are formed between the tip surrounding portion 16*m* and the second outer terminal 26 or the ground coupling portion 57.

According to the configuration above, since the tip surrounding portion 16*m* of the first outer terminal 16 and the second outer terminal 26 or the ground coupling portion 57 of the circuit board 50 are coupled with a short distance by the shortcut coupling paths 16*s*, 60, and 70, stable signal transmission may be performed in a radio frequency band (megahertz band or gigahertz band, for example).

Further, in the ground coupling structure in the coaxial connector set 30 of one embodiment, the shortcut coupling paths 16*s* and 70 are formed between the tip surrounding portion 16*m* and the second outer contact portion 26*b*.

According to the above-described embodiment, since the tip surrounding portion 16*m* and the second outer contact portion 26*b* are coupled with a short distance by the shortcut coupling paths 16*s* and 70, stable signal transmission may be performed in a radio frequency band (megahertz band or gigahertz band, for example).

Further, in the ground coupling structure in the coaxial connector set 30 of one embodiment, the shortcut coupling path is formed between the tip surrounding portion 16*m* and the second outer mount portion 26*a*.

According to the above-described embodiment, since the tip surrounding portion 16*m* and the second outer mount portion 26*a* are coupled with a short distance by the shortcut coupling paths 16*s* and 70, stable signal transmission may be performed in a radio frequency band (megahertz band or gigahertz band, for example).

Further, in the ground coupling structure in the coaxial connector set 30 of one embodiment, the interposing member 60 is disposed as the shortcut coupling path coupling the tip surrounding portion 16*m* and the ground coupling portion 57.

According to the above-described embodiment, since the tip surrounding portion 16*m* and the ground coupling portion 57 of the circuit board 50 are coupled with a short distance by the interposing member 60 functioning as the shortcut coupling path, stable signal transmission may be performed in a radio frequency band (megahertz band or gigahertz band, for example).

Further, in the ground coupling structure in the coaxial connector set 30 of one embodiment, the tip surrounding portion 16*m* and the interposing member 60 are configured to elastically come into contact with each other.

According to the above-described embodiment, a stable electrical coupling of the interposing member 60 and the tip surrounding portion 16*m* is provided.

Further, in the ground coupling structure in the coaxial connector set 30 of one embodiment, the bridge coupling portion 16*s* is disposed as the shortcut coupling path coupling the tip surrounding portion 16*m* and the second outer contact portion 26*b* or the second outer mount portion 26*a*.

According to the above-described embodiment, since the tip surrounding portion 16*m* and the second outer contact portion 26*b* or the second outer mount portion 26*a* are coupled with a short distance by the bridge coupling portion 16*s* functioning as the shortcut coupling path, stable signal transmission may be performed in a radio frequency band (megahertz band or gigahertz band, for example).

Further, in the ground coupling structure in the coaxial connector set 30 of one embodiment, the tip surrounding portion 16*m* and the bridge coupling portion 16*s* are configured to elastically come into contact with each other, or the second outer contact portion 26*b* or the second outer mount portion 26*a* and the bridge coupling portion 16*s* are configured to elastically come into contact with each other.

According to the above-described embodiment, a stable electrical coupling of the tip surrounding portion 16*m* and the bridge coupling portion 16*s* is provided, or a stable electrical coupling of the second outer contact portion 26*b* or the second outer mount portion 26*a* and the bridge coupling portion 16*s* is provided.

Further, in the ground coupling structure in the coaxial connector set 30 of one embodiment, the shield member 70 is disposed as the shortcut coupling path coupling the tip surrounding portion 16*m* and the second outer contact portion 26*b* or the second outer mount portion 26*a*.

According to the above-described embodiment, since the tip surrounding portion 16*m* and the second outer contact portion 26*b* or the second outer mount portion 26*a* are coupled with a short distance by the shield member 70 functioning as the shortcut coupling path, stable signal transmission may be performed in a radio frequency band (megahertz band or gigahertz band, for example).

Further, in the ground coupling structure in the coaxial connector set 30 of one embodiment, the shield member 70 has the shield portion 72 covering the gap formed between the first outer contact portion 16*b* and the tip surrounding portion 16*m*.

According to the above-described embodiment, by covering the gap formed between the first outer contact portion 16*b* and the tip surrounding portion 16*m* with the shield portion 72, the noise go in and out of the gap may be reduced.

Further, in the ground coupling structure in the coaxial connector set 30 of one embodiment, the first connector 10 is an L-type coaxial connector.

According to the above-described embodiment, since the distance between the tip surrounding portion 16*m* of the first outer terminal 16 and the ground coupling portion 57 of the circuit board 50 is shortened, stable signal transmission may be performed in a radio frequency band (megahertz band or gigahertz band, for example).

The ground coupling structure in the coaxial connector set 30 according to another aspect of the present disclosure is configured as follows. In the coaxial connector set 30 including the first connector 10 to which the coaxial cable 40 having the center conductor 42 and the outer conductor 41 is connected and the second connector 20 mounted on the circuit board 50 having the ground coupling portion 57. The first connector 10 has the first outer terminal 16 connected to the outer conductor 41 and the second connector 20 has the second outer terminal 26 to be coupled to the first outer terminal 16. The first outer terminal 16 includes the outer conductor clamp portion 16*c* clamping the outer conductor 41, the first outer contact portion 16*b* to be coupled to the second outer terminal 26, the tip surrounding portion 16*m* positioned between the outer conductor clamp portion 16*c* and the first outer contact portion 16*b* and surrounding the tip portion 42*a* of the center conductor 42, and the outer conductor connection portion 16*a* connecting the first outer contact portion 16*b* and the tip surrounding portion 16*m*. The second outer terminal 26 includes the second outer contact portion 26*b* to be coupled to the first outer contact portion 16*b* and the second outer mount portion 26*a* mounted on the ground coupling portion 57 of the circuit board 50. A coupling portion 16*s* coupling the tip surrounding portion 16*m* and the second outer terminal 26 or the ground coupling portion 57 without using the outer conductor connection portion 16*a* is provided. The coupling portion 16*s* is positioned closer to the circuit board 50 than the outer conductor connection portion 16*a*.

According to the above-described configuration, since the tip surrounding portion 16*m* of the first outer terminal 16 and the second outer terminal 26 or the ground coupling portion 57 of the circuit board 50 are coupled with a short distance by the coupling portion 16*s*, stable signal transmission may be performed in a radio frequency band (megahertz band or gigahertz band, for example).

Further, in the ground coupling structure in the coaxial connector set 30 of one embodiment, the coupling portion 16*s* is formed between the tip surrounding portion 16*m* and the second outer contact portion 26*b*.

According to the above-described embodiment, since the tip surrounding portion 16*m* and the second outer contact portion 26*b* are coupled with a short distance by the coupling portion 16*s*, stable signal transmission may be performed in a radio frequency band (megahertz band or gigahertz band, for example).

Further, in the ground coupling structure in the coaxial connector set 30 of one embodiment, the end portion of the coupling portion 16*s* on the side of the second outer contact portion 26*b* has a shape conforming to the outer shape of the second outer contact portion 26*b*.

According to the above-described embodiment, the other end portion of the coupling portion 16*s* is reliably electrically coupled to the second outer contact portion 26*b*.

Further, in the ground coupling structure in the coaxial connector set 30 of one embodiment, the second outer contact portion 26*b* has a circular shape as viewed from the plug-unplug direction (Z axis direction), and the end portion of the coupling portion 16*s* on the side of the second outer contact portion 26*b* has an arc shape as viewed from the plug-unplug direction (Z axis direction).

According to the above-described embodiment, the other end portion of the coupling portion 16*s* is reliably electrically coupled to the second outer contact portion 2*b*.

Further, in the ground coupling structure in the coaxial connector set 30 of one embodiment, the bent portion 16*y* is provided to the coupling portion 16*s* on the side of the tip surrounding portion 16*m* such that the end portion of the coupling portion 16*s* on the side of the second outer contact portion 26*b* elastically comes into contact with the second outer contact portion 26*b*.

According to the above-described embodiment, the elastic contact property and the electrical connectivity are improved.

Further, in the ground coupling structure in the coaxial connector set 30 of one embodiment, the coupling portion 16*s* is formed between the tip surrounding portion 16*m* and the second outer mount portion 26*a*.

According to the above-described embodiment, since the tip surrounding portion 16*m* and the second outer mount portion 26*a* are coupled with a short distance by the coupling portion 16*s*, stable signal transmission may be performed in a radio frequency band (megahertz band or gigahertz band, for example).

Further, in the ground coupling structure in the coaxial connector set 30 of one embodiment, the interposing member 60 is disposed as the coupling portion 16*s* coupling the tip surrounding portion 16*m* and the ground coupling portion 57.

According to the above-described embodiment, since the tip surrounding portion 16*m* and the ground coupling portion 57 of the circuit board 50 are coupled with a short distance by the interposing member 60 functioning as the coupling portion 16*s*, stable signal transmission may be performed in a radio frequency band (megahertz band or gigahertz band, for example).

Further, in the ground coupling structure in the coaxial connector set 30 of one embodiment, the tip surrounding portion 16*m* and the interposing member 60 are configured to elastically come into contact with each other.

According to the above-described embodiment, a stable electrical coupling of the interposing member 60 and the tip surrounding portion 16*m* is provided.

Further, in the ground coupling structure in the coaxial connector set 30 of one embodiment, the bridge coupling portion 16*s* is disposed as the coupling portion 16*s* coupling the tip surrounding portion 16*m* and the second outer mount portion 26*a* or the ground coupling portion 57.

According to the above-described embodiment, since the tip surrounding portion 16*m* and the second outer contact portion 26*b* or the second outer mount portion 26*a* are coupled with a short distance by the bridge coupling portion 16*s* functioning as the coupling portion 16*s*, stable signal transmission may be performed in a radio frequency band (megahertz band or gigahertz band, for example).

Further, in the ground coupling structure in the coaxial connector set 30 of one embodiment, the tip surrounding portion 16*m* and the bridge coupling portion 16*s* are configured to elastically come into contact with each other, or the second outer mount portion 26*a* or the ground coupling portion 57 and the bridge coupling portion 16*s* are configured to elastically come into contact with each other.

According to the above-described embodiment, a stable electrical coupling of the tip surrounding portion 16*m* and the bridge coupling portion 16*s* is provided, or a stable electrical coupling of the second outer contact portion 26*b* or the second outer mount portion 26*a* and the bridge coupling portion 16*s* is provided.

Further, in the ground coupling structure in the coaxial connector set 30 of one embodiment, the first connector 10 is an L-type coaxial connector.

According to the above-described embodiment, since the distance between the tip surrounding portion 16*m* of the first outer terminal 16 and the ground coupling portion 57 of the circuit board 50 is shortened, stable signal transmission may be performed in a radio frequency band (megahertz band or gigahertz band, for example).

Further, the coaxial connector set 30 according to another aspect of the present disclosure is characterized in that the coaxial connector set 30 includes the first connector 10 to which the coaxial cable 40 having the center conductor 42 and the outer conductor 41 is connected and the second connector 20 capable of being fitted to the first connector 10. The first connector 10 includes the outer conductor clamp portion 16*c* clamping the outer conductor 41, the first outer contact portion 16*b*, the tip surrounding portion 16*m* positioned between the outer conductor clamp portion 16*c* and the first outer contact portion 16*b* and surrounding the tip portion 42*a* of the center conductor 42, and the outer conductor connection portion 16*a* connecting the first outer contact portion 16*b* and the tip surrounding portion 16*m*. The second connector 20 includes the second outer contact portion 26*b*. In a fitted state of the first connector 10 and the second connector 20, the first outer contact portion 16*b* and the second outer contact portion 26*b* are fitted to each other; and a coupling portion 16*s* coupling the tip surrounding portion 16*m* and the second outer contact portion 26*b* is formed.

According to the above-described configuration, since the tip surrounding portion 16*m* of the first connector 10 and the second outer contact portion 26*b* of the second connector are coupled with a short distance by the coupling portion 16*s*, stable signal transmission may be performed in a radio frequency band (megahertz band or gigahertz band, for example).

What is claimed is:

1. A ground coupling structure in a coaxial connector set, the coaxial connector set including a first connector to which a coaxial cable having a center conductor and an outer conductor is connected and a second connector mounted on a circuit board having a ground coupling portion, wherein the first connector has a first outer terminal connected to the outer conductor and the second connector has a second outer terminal configured to couple to the first outer terminal;

the first outer terminal includes an outer conductor clamp portion clamping the outer conductor, a first outer contact portion configured to couple to the second outer terminal, and a tip surrounding portion positioned between the outer conductor clamp portion and the first outer contact portion and surrounding a tip portion of the center conductor;

the second outer terminal includes a second outer contact portion configured to couple to the first outer contact portion and a second outer mount portion mounted on the ground coupling portion of the circuit board; and a shortcut coupling path is between the tip surrounding portion and the second outer terminal or the ground coupling portion.

2. The ground coupling structure in the coaxial connector set according to claim 1, wherein the shortcut coupling path is between the tip surrounding portion and the second outer contact portion.

3. The ground coupling structure in the coaxial connector set according to claim 1, wherein the shortcut coupling path is between the tip surrounding portion and the second outer mount portion.

4. The ground coupling structure in the coaxial connector set according to claim 1, wherein an interposing member is disposed as the shortcut coupling path coupling the tip surrounding portion and the ground coupling portion.

5. The ground coupling structure in the coaxial connector set according to claim 4, wherein the tip surrounding portion and the interposing member are configured to elastically come into contact with each other.

6. The ground coupling structure in the coaxial connector set according to claim 1, wherein a bridge coupling portion is disposed as the shortcut coupling path coupling the tip surrounding portion and the second outer mount portion or the ground coupling portion.

7. The ground coupling structure in the coaxial connector set according to claim 6, wherein the tip surrounding portion and the bridge coupling portion are configured to elastically come into contact with each other, or the second outer mount portion or the ground coupling portion and the bridge coupling portion are configured to elastically come into contact with each other.

8. The ground coupling structure in the coaxial connector set according to claim 1, wherein a shield member is disposed as the shortcut coupling path coupling the tip surrounding portion and the second outer mount portion or the ground coupling portion.

9. The ground coupling structure in the coaxial connector set according to claim 8, wherein the shield member has a shield portion covering a gap between the first outer contact portion and the tip surrounding portion.

10. The ground coupling structure in the coaxial connector set according to claim 1, wherein the first connector is an L-type coaxial connector.

11. A ground coupling structure in a coaxial connector set, the coaxial connector set including a first connector to which a coaxial cable having a center conductor and an outer conductor is connected and a second connector mounted on a circuit board having a ground coupling portion, wherein the first connector has a first outer terminal connected to the outer conductor and the second connector has a second outer terminal configured to couple to the first outer terminal;

the first outer terminal includes an outer conductor clamp portion clamping the outer conductor, a first outer contact portion configured to couple to the second outer terminal, a tip surrounding portion positioned between the outer conductor clamp portion and the first outer contact portion and surrounding a tip portion of the center conductor, and an outer conductor connection portion connecting the first outer contact portion and the tip surrounding portion;

the second outer terminal includes a second outer contact portion configured to couple to the first outer contact portion and a second outer mount portion mounted on the ground coupling portion of the circuit board;

a coupling portion coupling the tip surrounding portion and the second outer terminal or the ground coupling portion without using the outer conductor connection portion is provided; and the coupling portion is positioned closer to the circuit board than the outer conductor connection portion.

12. The ground coupling structure in the coaxial connector set according to claim 11, wherein the coupling portion is between the tip surrounding portion and the second outer contact portion.

13. The ground coupling structure in the coaxial connector set according to claim 12, wherein an end portion of the coupling portion on a side of the second outer contact portion has a shape conforming to an outer shape of the second outer contact portion.

14. The ground coupling structure in the coaxial connector set according to claim 13, wherein the second outer contact portion has a circular shape as viewed from a plug-unplug direction, and the end portion of the coupling portion on the side of the second outer contact portion has an arc shape as viewed from the plug-unplug direction.

15. The ground coupling structure in the coaxial connector set according to claim 11, wherein a bent portion is provided to the coupling portion on a side of the tip surrounding portion such that an end portion of the coupling portion on a side of the second outer contact portion elastically comes into contact with the second outer contact portion.

16. The ground coupling structure in the coaxial connector set according to claim 11, wherein the coupling portion is between the tip surrounding portion and the second outer mount portion.

17. The ground coupling structure in the coaxial connector set according to claim 11, wherein an interposing member is disposed as the coupling portion coupling the tip surrounding portion and the ground coupling portion.

18. The ground coupling structure in the coaxial connector set according to claim 17, wherein the tip surrounding portion and the interposing member are configured to elastically come into contact with each other.

19. The ground coupling structure in the coaxial connector set according to claim 11, wherein a bridge coupling portion is disposed as the coupling portion coupling the tip surrounding portion and the second outer mount portion or the ground coupling portion.

20. The ground coupling structure in the coaxial connector set according to claim 19, wherein the tip surrounding portion and the bridge coupling portion are configured to elastically come into contact with each other, or the second outer mount portion or the ground coupling portion and the bridge coupling portion are configured to elastically come into contact with each other.

21. The ground coupling structure in the coaxial connector set according to claim 11, wherein the first connector is an L-type coaxial connector.

22. A coaxial connector set comprising:

a first connector to which a coaxial cable having a center conductor and an outer conductor is connected; and a second connector configured to fit to the first connector, wherein the first connector includes an outer conductor clamp portion clamping the outer conductor, a first outer contact portion, a tip surrounding portion positioned between the outer conductor clamp portion and the first outer contact portion and surrounding a tip portion of the center conductor, and an outer conductor connection portion connecting the first outer contact portion and the tip surrounding portion;

the second connector includes a second outer contact portion; and in a fitted state of the first connector and the second connector the first outer contact portion and the second outer contact portion are fitted to each other; and a coupling portion coupling the tip surrounding portion and the second outer contact portion is configured.

23. A ground coupling structure in a coaxial connector set, the coaxial connector set including a first connector to which a coaxial cable having a center conductor and an outer conductor is connected and a second connector mounted on a circuit board having a ground coupling portion, wherein the first connector has a first outer terminal connected to the outer conductor and the second connector has a second outer terminal configured to couple to the first outer terminal;

the first outer terminal includes an outer conductor clamp portion clamping the outer conductor, a first outer contact portion configured to couple to the second outer terminal, and a tip surrounding portion positioned between the outer conductor clamp portion and the first outer contact portion and surrounding a tip portion of the center conductor;

the second outer terminal includes a second outer contact portion configured to couple to the first outer contact portion;

a coupling portion to electrically couple the tip surrounding portion and the second outer contact portion is disposed;

the coupling portion extends obliquely upward from a lower surface of the tip surrounding portion; and the coupling portion is integrated with the tip surrounding portion.

24. The ground coupling structure in the coaxial connector set according to claim 23, wherein a distance between the coupling portion and the circuit board in a direction perpendicular to a planar direction of the circuit board becomes largest at a contact portion with the second outer contact portion in a region to a portion where the coupling portion comes into contact with the second outer contact portion.

25. A ground coupling structure in a coaxial connector set, the coaxial connector set including a first connector to which a coaxial cable having a center conductor and an outer conductor is connected and a second connector mounted on a circuit board having a ground coupling portion, wherein the first connector has a first outer terminal connected to the outer conductor and the second connector has a second outer terminal configured to couple to the first outer terminal;

the first outer terminal includes an outer conductor clamp portion clamping the outer conductor, a first outer contact portion configured to couple to the second outer terminal, and a tip surrounding portion positioned between the outer conductor clamp portion and the first outer contact portion and surrounding a tip portion of the center conductor;

the second outer terminal includes a second outer contact portion configured to couple to the first outer contact portion;

a coupling portion to electrically couple the tip surrounding portion and the second outer contact portion is disposed;

the coupling portion is configured to extend from the tip surrounding portion to the second outer contact portion such that a distance between the coupling portion and the circuit board in a direction perpendicular to a planar direction of the circuit board becomes largest at a contact portion with the second outer contact portion in a region from a portion where the coupling portion extends obliquely upward from a lower surface of the tip surrounding portion to a portion where the coupling portion comes into contact with the second outer contact portion.

26. The ground coupling structure in the coaxial connector set according to claim 23, wherein the coupling portion extends such that a distance between the coupling portion and the circuit board in a direction perpendicular to a planar direction of the circuit board gradually increases as the coupling portion extends from the lower surface of the tip surrounding portion to couple to the second outer contact portion.

27. The ground coupling structure in the coaxial connector set according to claim 25, wherein the coupling portion linearly extends obliquely upward from the lower surface of the tip surrounding portion.

28. The ground coupling structure in the coaxial connector set according to claim 25, wherein the coupling portion is integrated with the tip surrounding portion.

29. The ground coupling structure in the coaxial connector set according to claim 25, wherein the coupling portion has a first portion linearly extending obliquely upward from the lower surface of the tip surrounding portion, a second portion extending in a lateral direction from the first portion, and a third portion curving downward from the second portion and abutting on the second outer contact portion.

30. The ground coupling structure in the coaxial connector set according to claim 23, wherein the tip surrounding portion and the coupling portion are configured to elastically come into contact with each other.

31. The ground coupling structure in the coaxial connector set according to claim 23, wherein a tip portion of the coupling portion has a curved shape.

32. The ground coupling structure in the coaxial connector set according to claim 23, wherein the first connector is an L-type coaxial connector.

* * * * *